United States Patent
Knight et al.

(10) Patent No.: US 7,860,145 B2
(45) Date of Patent: Dec. 28, 2010

(54) ADAPTIVE CODE GENERATOR FOR SATELLITE NAVIGATION RECEIVERS

(75) Inventors: Jerry Eugene Knight, Long Beach, CA (US); Charles R. Cahn, Manhattan Beach, CA (US); David Man Kui Li, Harbor City, CA (US)

(73) Assignee: NavCom Technology, Inc., Torrance, CA (US)

( * ) Notice: Subject to any disclaimer, the term of this patent is extended or adjusted under 35 U.S.C. 154(b) by 834 days.

(21) Appl. No.: 11/417,965

(22) Filed: May 3, 2006

(65) Prior Publication Data

US 2007/0258511 A1    Nov. 8, 2007

(51) Int. Cl.
*H04B 1/00* (2006.01)
(52) U.S. Cl. .................... 375/130; 375/132; 375/150; 375/222; 375/259; 375/306
(58) Field of Classification Search ......... 375/130–132, 375/135–137, 142–148, 150, 367, 139–140, 375/152, 219, 295, 306, 316, 354, 259, 299
See application file for complete search history.

(56) References Cited

U.S. PATENT DOCUMENTS

| | | | |
|---|---|---|---|
| 4,876,659 A | 10/1989 | Devereux et al. | |
| 5,852,630 A * | 12/1998 | Langberg et al. | 375/219 |
| 6,292,506 B1 * | 9/2001 | Brendle et al. | 375/130 |
| 6,804,264 B1 * | 10/2004 | Song | 370/500 |
| 7,167,504 B1 * | 1/2007 | Mower et al. | 375/142 |
| 7,630,430 B2 * | 12/2009 | Bochkovskiy et al. | 375/150 |
| 2001/0048380 A1 | 12/2001 | Medlock et al. | 341/50 |
| 2002/0075945 A1 * | 6/2002 | Farine et al. | 375/148 |
| 2002/0138534 A1 * | 9/2002 | Drescher | 708/492 |
| 2004/0078555 A1 * | 4/2004 | Porten et al. | 712/221 |
| 2005/0281231 A1 * | 12/2005 | Kwon et al. | 370/335 |
| 2006/0023776 A1 * | 2/2006 | Hsu | 375/150 |
| 2006/0067451 A1 * | 3/2006 | Pollman et al. | 375/367 |
| 2006/0109888 A1 * | 5/2006 | Medlock | 375/130 |

FOREIGN PATENT DOCUMENTS

| | | |
|---|---|---|
| EP | 1 343 265 A1 | 9/2003 |
| WO | 01/48936 | 7/2001 |
| WO | WO 02/093769 A1 | 11/2002 |

OTHER PUBLICATIONS

"Navstar GPS Space Segment / User Segment L5 Interfaces," ARNIC Inc., Mar. 29, 2002.

(Continued)

*Primary Examiner*—Shuwang Liu
*Assistant Examiner*—Hirdepal Singh
(74) *Attorney, Agent, or Firm*—Morgan, Lewis & Bockius LLP

(57) ABSTRACT

A satellite navigation device including a receiver having an adjustable code generator is described. The adjustable code generator is configurable to generate a set of spread-spectrum code signals. Each spread-spectrum code signal has a respective length corresponding to a repetition period. The set of spread-spectrum code signals includes first and second spread-spectrum code signals having distinct first and second lengths.

28 Claims, 16 Drawing Sheets

OTHER PUBLICATIONS

"GLONASS Interface Control Document," Coordination Scientific Information Center, 1998.

Simon, et al., "Spread Spectrum Communications," Computer Science Press, vol. 1, 1985, p. 276.

Hollreiser, Martin et al., Galileo User Segment Overview, Sep. 9, 2003, Proceedings of the Institute of Navigation, (ION) GPS, pp. 1914-1928, XP002316875, col. 5-9, 12.

International Search Report and Written Opinion for International Application No. PCT/US2007/008960, mailed Aug. 14, 2008.

* cited by examiner

ADAPTIVE CODE GENERATOR FOR SATELLITE NAVIGATION RECEIVERS

FIELD OF THE INVENTION

The present invention relates generally to a global navigation satellite system (GNSS), and more specifically, to an adaptive code generator for satellite navigation receivers.

BACKGROUND OF THE INVENTION

Receivers in a global navigation satellite system (GNSS), such as the Global Positioning System (GPS), use range measurements that are based on line-of-sight navigation signals broadcast from satellites. A receiver measures a time-of-arrival of one or more broadcast signals. This time-of-arrival measurement includes a time measurement based upon a coarse acquisition (C/A) coded portion of a signal, called pseudo-range, and a phase measurement.

The navigation signals from satellites in a GNSS are broadcast on carrier signal frequencies and use one or more pseudo-random codes. Navigation information, such as the pseudo-range and/or the phase measurement, in the navigation signals may be recovered in a receiver using correlation in a code tracking loop. Correlation may de-spread an energy of the navigation signals and thereby may de-modulate signals encoded with one or more pseudo-random codes. The correlation operation in effect mixes a received navigation signal from a satellite with a replica of the signal generated in the receiver. Generation of the replica of the signal in the receiver includes generating a corresponding pseudo-random code. If a phase, carrier signal frequency and timing of the replica signal substantially duplicate the received navigation signal from the satellite, an output power is maximized. If there are timing errors in the replica signal, the output power is reduced if the timing of the pseudo-random code is in error by less than one pseudo-random code bit, or is zero if the timing error is greater than or equal to the pseudo-random code bit.

There are, however, many different pseudo-random codes corresponding to navigation signals from different satellites in a GNSS (for those GNSSs that utilize code diversity multiple access methods to mitigate inter-satellite interference) as well as different GNSSs. In order to recover a wide variety of navigation signals, the receiver often will have circuitry for generating many different pseudo-random codes. This circuitry adds complexity and cost to the receiver. As a consequence, there is a need for improved generation of pseudo-random codes in GNSS receivers.

SUMMARY

A satellite navigation device including a receiver having an adjustable code generator is described. The adjustable code generator is configurable to generate a set of spread-spectrum code signals. Each spread-spectrum code signal has a respective length corresponding to a repetition period. The set of spread-spectrum code signals includes first and second spread-spectrum code signals having distinct first and second lengths.

The adjustable code generator may include a feedback loop and a programmable shift register having a number of bits that is greater than or equal to a degree of a composite Galois polynomial corresponding to the set of spread-spectrum code signals. The number of bits in the programmable shift register may correspond to a largest sum of degrees of respective polynomials that describe a respective spread-spectrum code signal in the set of spread-spectrum code signals. The set of polynomials may include irreducible Galois Field polynomials and/or the set of spread-spectrum signals may include maximal length sequences.

The feedback loop further may include a programmable feedback mask and a feedback mask table. The feedback mask table contains a set of feedback masks. A respective feedback mask for a respective spread-spectrum code signal may be a binary representation of a corresponding polynomial.

In some embodiments, the feedback loop has multiple input bits and a single output bit. The single output bit is determined by an exclusive- or tree of the multiple input bits. In some embodiments, the feedback loop has multiple input bits and multiple output bits. Each of the multiple output bits is determined by an exclusive- or of an output bit from the programmable shift register and a respective input bit.

The adjustable code generator may include an initial state table. The initial state table contains a set of initial state vectors. Each initial state vector corresponds to initial values of the bits in the programmable shift register corresponding to at least one of the set of spread-spectrum signals.

The adjustable code generator may include control logic In some embodiments, the control logic determines when the respective spread-spectrum signal generated using the adjustable code generator has reached the respective length and starts the next code period by programming an initial state vector in the set of initial state vectors stored in the initial state vector table into the programmable shift register. In some embodiments, the control logic determines when the respective spread-spectrum signal generated using the adjustable code generator has reached a termination condition and starts the next code period by programming the initial state vector in the set of initial state vectors stored in the initial state vector table into the programmable shift register.

The adjustable code generator may also include a short cycle state table. The short cycle state table contains a set of short cycle state vectors and each short cycle state vector corresponds to values of the bits in the programmable shift register corresponding to at least one of the set of spread-spectrum signals at a pre-determined fraction of the respective length. The control logic determines when the respective spread-spectrum signal generated using the adjustable code generator has reached the pre-determined fraction of the respective length.

BRIEF DESCRIPTION OF THE DRAWINGS

Additional objects and features of the invention will be more readily apparent from the following detailed description and appended claims when taken in conjunction with the drawings.

Like reference numerals refer to corresponding parts throughout the several views of the drawings.

DESCRIPTION OF EMBODIMENTS

Figure 1:
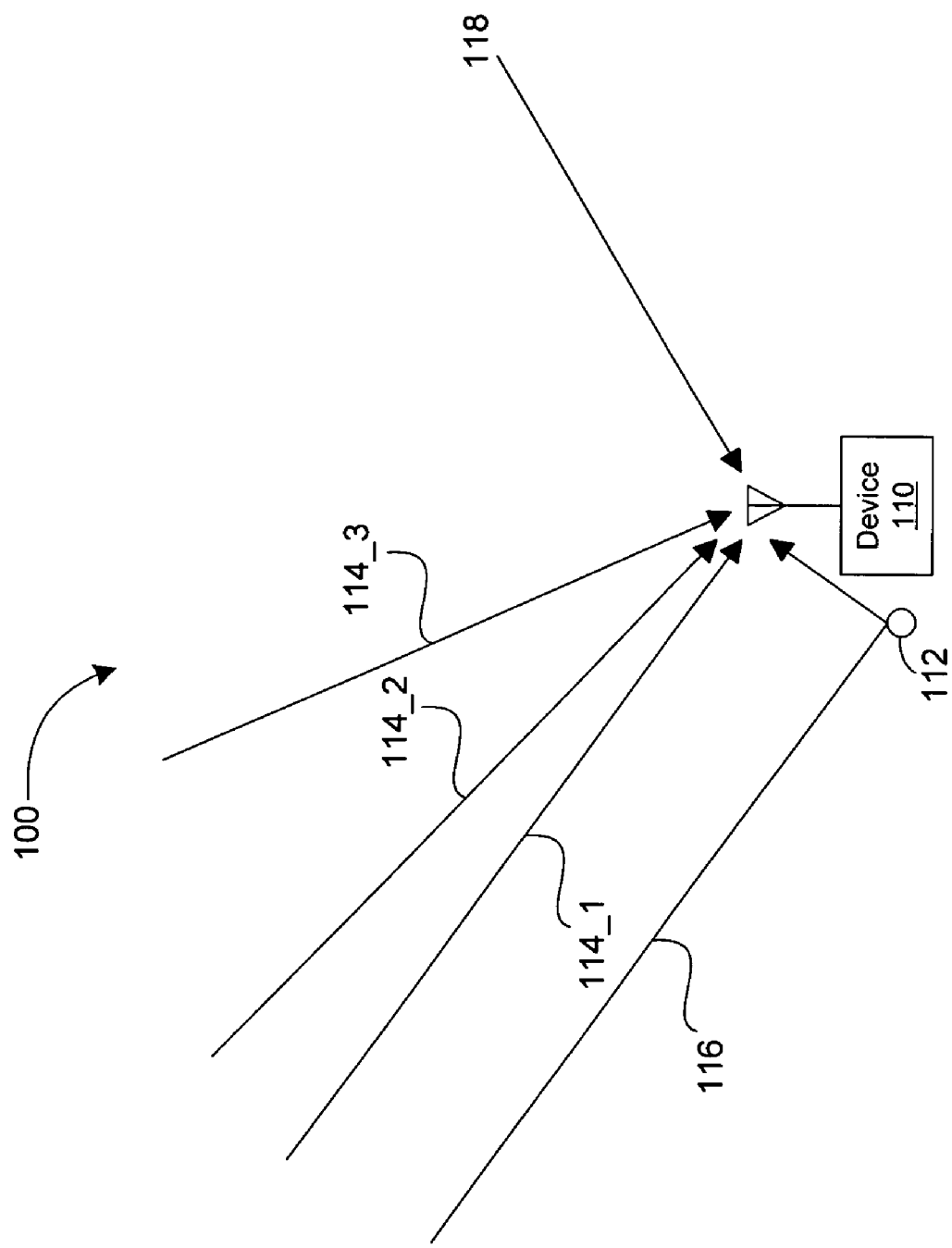
FIG. 1 is a diagram illustrating a global navigation satellite system (GNSS) with direct-path signals and a multi-path signal.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

A satellite navigation device including a receiver having at least one configurable and/or adjustable code generator, henceforth referred to as an adjustable code generator, is described. In some embodiments, there is a single adjustable code generator. In some embodiments, the adjustable code generator is programmable. The adjustable code generator is configurable to generate a set of pseudo-random code signals, henceforth called spread-spectrum code signals. Each spread-spectrum code signal has a respective length corresponding to a repetition period. The set of spread-spectrum code signals may include first and second spread-spectrum code signals having distinct first and second lengths. In some embodiments, the set of spread-spectrum code signals only includes spread-spectrum code signals having a first length. The adjustable code generator may be in a first domain having a feedback loop with multiple input bits and a single output bit or in a second domain having a feedback loop with multiple input bits and multiple output bits. The adjustable code generator may reduce the complexity and/or cost of a receiver in a GNSS.

In the embodiments of the satellite navigation device, navigation is understood to include determining a location or a position, also known as position fixing. Navigation is to be interpreted as determining where the satellite navigation device is with respect to a frame of reference that is at least in part provided by satellites in a GNSS. Navigation may also determine a time at the satellite navigation device based, at least in part, on signals from one or more satellites in a GNSS. GNSSs include, but are not limited to, a Global Positioning System (GPS), a Global Orbiting Navigation Satellite System (GLONASS), a GALILEO positioning system, a European Geostationary Navigation Overlay System (EGNOS), a Wide Area Augmentation System (WAAS), a Multifunctional Transport Satellite-Based Augmentation System (MSAS), a Quasi-Zenith Satellite System (QZSS), as well as a StarFire Network from NavCorn Technology, Inc.

With the exception of GLONASS, GNSS satellites use code diversity multiple access (CDMA) methods to mitigate inter-satellite interference. The non-GLONASS satellites broadcast signals on carrier signal frequencies in an L-band and use spread-spectrum code signals. The GLONASS system uses frequency diversity multiple access (FDMA) to provide inter-satellite interference protection. Each GLONASS satellite uses the same spread-spectrum code. With the exception of antipodal satellites, located in the same orbit on opposite sides of the Earth, each satellite has its own frequency band. Antipodal satellites may share the same frequency band.

Using GPS as an example, satellites broadcast navigation signals having a 1575.42 MHz L1 carrier signal frequency and a 1227.6 MHz L2 carrier signal frequency. A third GPS signal is planned for a 1176.45 MHz L5 carrier signal frequency. The GALILEO system plans to provide signals at the L1 and L5 (also called E5A) carrier signal frequencies and additional signals at the 1207.14 MHz (E5B) and 1278.75 MHz (E6) carrier signal frequencies. GALILEO will also provide additional signals with different spread-spectrum codes having the L1 carrier signal frequency. The QZSS system plans to provide GPS compatible signals on the L1, L2 and L5 carrier signal frequencies. QZSS also plans to provide signals having an as-yet-undefined L6 carrier signal frequency. Satellites in WAAS, EGNOS and MSAS provide GPS-like signals having the L1 carrier signal frequency, and plan to provide a second signal having the L5 carrier signal frequency.

The StarFire Network, which functions at least partially as a communications link, uses channels that are 840 Hz wide in a frequency band between 1525 and 1560 MHz. StarFire Network transmits data at 1200 or 2400 coded bits per second.

GLONASS broadcasts signals in the 1598.0635 to 1605.375 MHz (L1) and 1242.9375 to 1248.625 MHz (L2) band of frequencies. The bands of frequencies of signals in GLONASS overlap a high-end portion of corresponding bands of frequencies of signals in GPS and GALILEO.

FIG. 1 illustrates a composite signal received by a device 110 in an embodiment of a GNSS 100. The composite signal includes one or more signals 114 broadcast by one or more satellites as well as a multi-path signal 116 that is reflected off an object 112. As discussed above, the signals 114 each contain at least one spread-spectrum signal corresponding to at least one satellite.

Figure 2A:
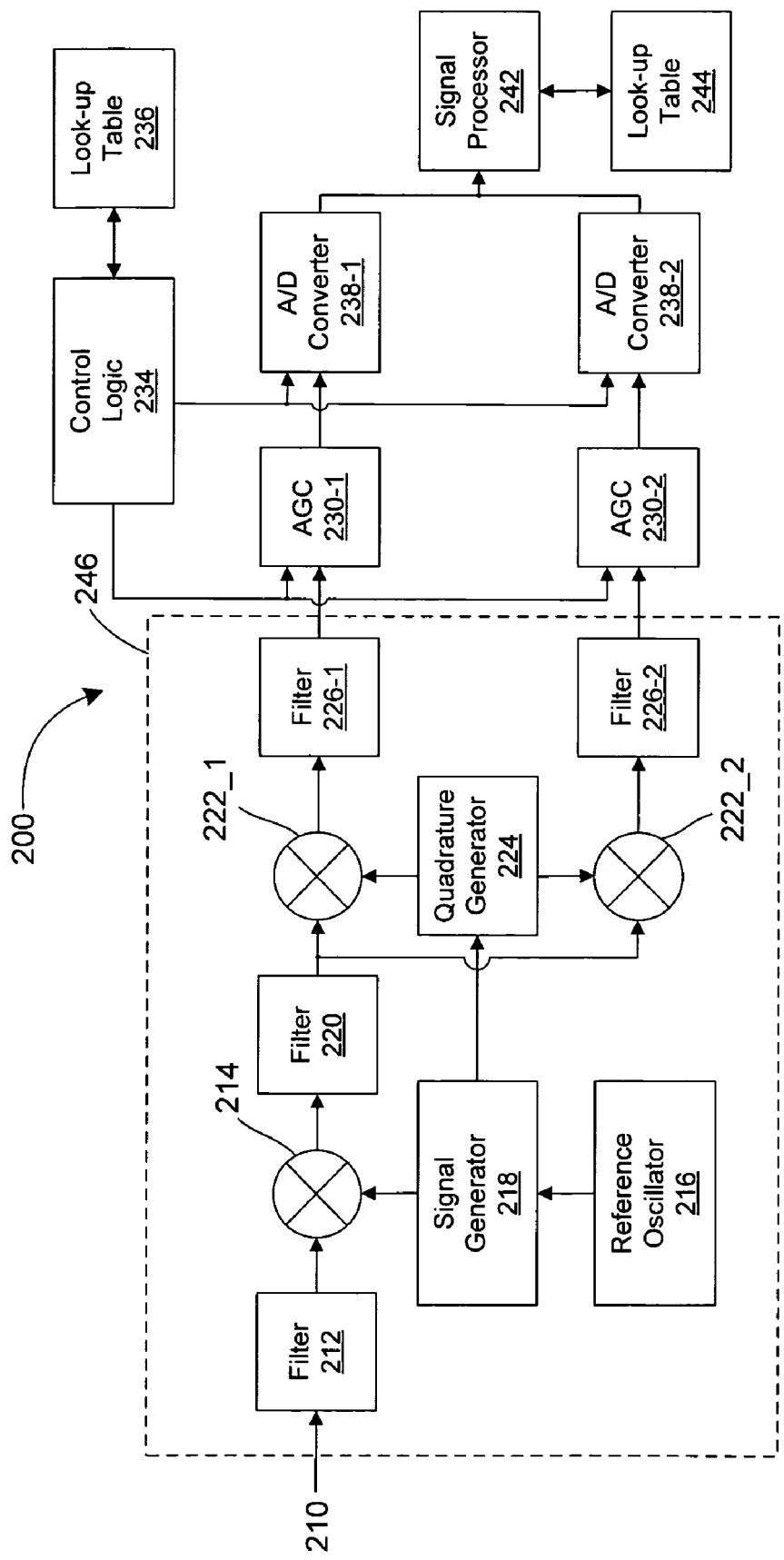
FIG. 2A is a block diagram illustrating components in a channel in a GNSS receiver.

FIG. 2A illustrates components in an embodiment of a sub-channel circuit 200 in a first channel in the receiver in the device 110 (FIG. 1). The composite signal is received by a front-end circuit including one or more antenna. Antenna inputs may be amplified or unamplified (passive) and may combine one or multiple frequencies per antenna connector in a router in the front-end circuit. In embodiments with an unamplified antenna or a long connector or cable between the antenna and the router, the front-end circuit may include an initial gain stage. At least a portion of the composite signal 210 is routed to one or more channels. The channels each include one or more sub-channel circuits, such as the sub-channel circuit 200. The sub-channel circuit 200 receives a respective frequency band in at least the one spread-spectrum signal, corresponding to at least the first satellite, in at least the portion of the composite signal 210.

The composite signal 210 is coupled to a low loss filter 212 to reject signal images and out-of-band interference. The signal may also be amplified in an amplifier (not shown) and/or filtered in filter (not shown) before coupling to the filter 212. In embodiments with the initial low-noise amplifier in the front-end electronics, this amplifying may be eliminated. At least a portion of the signal is down converted to an intermediate frequency (IF) using one or more modulators, such as mixer 214. In some embodiments, the IF is common in one or more additional sub-channel circuits. Down conversion in the mixer 214 mixes a first reference signal, having a respective first carrier or local oscillator (LO) frequency, that is generated by a signal generator 218.

The first reference signal may be generated based on one of more clock signals, which may be generated by reference oscillator 216. Each sub-channel circuit in the receiver has a unique first LO frequency thereby allowing a respective sub-channel circuit, such as sub-channel circuit 200, to receive a respective frequency band in at least the one spread-spectrum signal from the first satellite. The sub-channel circuits may receive one or more of the clock signals from at least one common reference oscillator in the receiver. In other embodiments, there may not be the common reference oscillator. The reference oscillator 216 may include one or more phase locked loops, delay locked loops and/or interpolation circuits.

After down conversion, the signal at the IF is passed through a high-quality filter 220, such as a surface acoustic wave filter, that removes alias and interference signals and reject out of band interference. The high-quality filter 220 may allow other filters in the channel 300, such as the front-end pre-selection filtering, to be of lower precision, may allow easier implementation of automatic gain control (AGC) 230 and may also allow fewer bits quantization in analog-to-digital (A/D) converters 238. Filters in the sub-channel circuits, such as the filter 220, define a signal processing bandwidth for the signal in the receiver. As a consequence, these filters help define overall signal processing characteristics of the receiver. In some embodiments, the filters, such as the filter 220, may have a central frequency substantially equal to the IF and a bandwidth greater than approximately a bandwidth of the first satellite. In some embodiments, the bandwidth (3 dB passband) of one or more of the filters, such as the filter 220, may be greater than approximately 30 MHz (double sided). In some embodiments, the bandwidth (3 dB passband) of one or more of the filters, such as the filter 220, may be within an inclusive range of approximately 30 to 32 MHz (double sided). In an exemplary embodiment, the filter 220 may be equivalent to 6 or more complex poles. For a sub-channel corresponding to signals from the StarFire Network, the filter 220 also may have a central frequency substantially equal to the IF. In this case, however, the bandwidth of the filter 220 may be 200 kHz, since the signal in the StarFire network uses a smaller bandwidth.

By ensuring that the bandwidth of the filters, such as the filter 220, is at least slightly greater than filtering applied to the broadcast signals by one or more of the GNSS satellites, signal content will not be lost and as much out-of-band interference as possible is rejected. If the bandwidth of filters in one or more of the satellites is increased in the future, the bandwidth of one or more of the filters, such as the filter 220, also may be increased, so that signal content will not be lost. This may enable improved correction of the multi-path signal 116 (FIG. 1) and/or improved tracking characteristics of the receiver.

The signal in one or more sub-channel circuit, such as sub-channel circuit 200, is converted to substantially near baseband (zero frequency) using one or more modulators, such as mixers 222. Down conversion in the mixers 222 mixes second reference signals, each having a second carrier or LO frequency and that are substantially in quadrature with one another, that are provided by quadrature signal generator 224. The second reference signal may be generated based on at least one clock signal from the reference oscillator 216 and/or the common reference oscillator. Substantially near baseband may include frequencies substantially less than one-quarter of a sampling rate in the A/D converters 238. In some embodiments, substantially near baseband may include frequencies less than approximately 100 kHz.

Down converting to substantially near baseband effectively introduces an intentional Doppler frequency shift. One way to implement this is to set the carrier signal frequency of at least the one clock signal such that it is about 40 parts per million (PPM) too fast. This offset ensures that the in-phase I and out-of-phase Q samples from the A/D converters 238 all have a positive apparent Doppler frequency shift, which simplifies the design of signal generators, such as numerically controlled oscillators (NCOs), in signal processing circuits such as signal processor 242. The offset also ensures that digital sampling edges are randomly distributed with respect to a timing of code bit edges in at least the one spread-spectrum signal from at least the first satellite.

In an exemplary embodiments, the reference oscillator 216 has a nominal carrier signal frequency of 16.36864 MHz. This is 39.101 MHz or approximately 40 PPM larger than 1.6 times the GPS 10.23 MHz fundamental carrier signal frequency. The carrier signal frequency of at least the one clock signal from the reference oscillator 216 may vary over its lifetime by another 10 PPM due to aging and/or temperature variations. In other exemplary embodiments, the reference oscillator 216 may include a temperature compensated crystal oscillator (TCXO) and/or a voltage compensated crystal oscillator (VCXO).

The frequencies of the IF, first LO and second LO may preserve coherent relationships between code and carrier signal frequencies used by GNSS signals. For all GNSS signals, there are a substantially integer number of carrier cycles per code bit. Selected down-conversion frequencies, i.e., the respective first LO frequency and the second LO frequency, may preserve these relationships. Note that the relationships, however, are not sensitive to Doppler frequency shifts caused by satellite-receiver motion, reference signal and/or clock signal errors in the satellite or receiver, and/or the intentional Doppler frequency shift discussed above. As discussed below, the receiver takes advantage of this property.

The IF and the second LO frequency may be substantially identical multiples of a frequency of at least a respective clock signal from the common reference oscillator in the receiver and/or the reference oscillator 216. Neglecting sources of Doppler (mentioned above), the sum of the two down-conversion frequencies, i.e., the respective first LO frequency and the second LO frequency, in each of the sub-channel circuits may be substantially equal to a respective carrier signal frequency, corresponding to the respective frequency band, in at least the one spread-spectrum signal from the first satellite. For example, the GPS L1 frequency band has a nominal carrier signal frequency of 1575.42 MHz, which is equal to 154·10.23 MHz. In embodiments where the receiver 200 uses a clock signal form the reference oscillator 216 having a frequency of $N_1 \cdot 10.23$ MHz, a first and a second LO are generated from this clock signal. The respective frequencies of these LO may obey several relationships that insure that the range measured by tracking the carrier frequency is substantially the same as the range measured by tracking the code. The carrier frequencies for each of the L-band signals can also be expressed in the form $N_0 \cdot 154$. ($N_0=154$ for L1, 120 for L2, 115 for L5, 118 for E5A and 125 for E6.). The frequency of the first LO is created by multiplying the reference clock signal by A, i.e., $LO_1 = A \cdot N_1 \cdot 10.23$ MHz. The frequency of the second LO is substantially equal to the IF and is created by multiplying the reference clock signal by B, i.e., $LO_2 = B \cdot N_1 \cdot 10.23$ MHz. Multipliers A and B are chosen such that they obey the relationship $s \cdot (N_0 - A \cdot N_1) = B \cdot N_2$, where $s=1$ for a low-side down conversion and $s=-1$ for a high-side down conversion. For example, if the high-side first down conversion is used to convert the L1 signal to an IF equal to $13.7 \cdot 10.23$ MHz (=140.151 MHz), s is equal to $-1$ and $B \cdot N_1$ is equal to $154+13.7$ or 167.7. If the low-side down conversion is used instead, s is equal to 1 and $B \cdot N_1$ is equal to $154-13.7$ or 140.3. A different multiplier A may be used for each of the GNSS frequencies. The same IF and multiplier B may be used for all frequencies. Note that, in a sense, high-side conversion produces an IF with a negative frequency, but the filters in the receiver and subsequent down conversions behave the same for positive and negative frequencies.

One or more sub-channel circuits for signals from the StarFire Network may not use quadrature detection. The second LO frequency may be adjusted in small, approximately 21 Hz, steps so that the second LO frequency matches a central frequency of the StarFire communication channel. A controller in the receiver, the first channel and/or one of the sub-channel circuits, such as the sub-channel circuit 200, may sequentially program signal generator 224 to appropriate frequencies corresponding to each possible StarFire band of frequencies to determine if the respective signal is present. Note that it may not be necessary to maintain special relationships between the code and the carrier signal frequencies in the StarFire signal processing, so there may be more freedom in the selection of the respective first LO frequency and the second LO frequency.

After down conversion to near baseband, the I and Q signals are coupled to low-pass filters 226 to remove unwanted spectral components. The signals are amplified using gains in AGC 230 and sampled and quantized in the A/D converters 238 to produce I and Q samples. The I and Q samples are processed in the signal processor 242. The signal processor 242 may use values stored in look-up table 244. AGC 230 and the A/D converters 238 may be configured and/or adjusted by control logic 234 using values stored in look-up table 236. Configuring and/or adjusting of the AGC 230 and/or the A/D converters 238 may include one or more gains of at least one AGC 230 and/or one or more A/D quantization threshold magnitude in the A/D converters 238. In an exemplary embodiment, the gain of the AGC 230 may be determined at a first non-zero quantization threshold magnitude such that a probability of a non-zero sample or activity is substantially $\frac{2}{3}$. Using this gain, non-zero samples may be determined using a second non-zero quantization threshold magnitude that is substantially twice the first A/D quantization threshold magnitude in order to improve anti-jamming performance of the receiver. The receiver may also use a blanking circuitry to improve performance in the presence of strong jamming signals.

In some embodiments, the IF, the first LO frequency and/or the second LO frequency in one or more of the sub-channel circuits, such as the sub-channel circuit 200, may be adjustable and/or configurable. This is implemented by adjusting and/or reconfiguring at least one signal generator, such as signal generator 218 using the controller in the receiver, the first sub-channel and/or one of the sub-channel circuits, such as the sub-channel circuit 200. For example, the second LO frequency in the reference signal from the quadrature signal generator 224 may be adjusted in steps of a few hundred Hz. When adapting or configuring the IF, at least one of the filter 220, the filters 226, the mixers 222 and/or the mixer 214 may be adjusted or reconfigured.

By allowing the IF, the first LO frequency and/or the second LO frequency to be configurable, the IF can be configured to a value within an inclusive range of approximately 100 to 350 MHz. Embodiments where the IF, the first LO frequency and/or the second LO frequency are adjustable may allow one or more of the sub-channel circuits to be dynamically configured to an IF with the inclusive range. A configurable or adaptable IF offers additional design degrees of freedom. These degrees of freedom may allow the IF in one or more sub-channels to be changed to meet requirements of components, such as filters 212, 220 and/or 226, signal generator 218, quadrature signal generator 224, and/or mixers 214 and 222. For example, if during a production lifetime of the receiver, one or more components become obsolete or one or more better components corresponding to a different IF range become available, the IF may be changed by configuring or adapting the first LO frequency and/or the second LO frequency in one or more sub-channel circuit. In exemplary embodiments, the IF may be 140, 160 and/or 200 MHz, since these values may match the specifications of low-cost filters and mixers that have been developed for cellular telephones.

In other embodiments, the sub-channel 200 may have fewer or more components. Functions of two or more components may be implemented in a single component. Alternatively, functions of some components may be implemented in additional instances of the components or in components elsewhere in the receiver. While FIG. 2A illustrates one sub-channel circuit 200, in some embodiments there may be more sub-channel circuits. In some embodiments, one or more of the sub-channel circuits may not use quadrature detection and sampling. Instead, the signal may be converted to near baseband in one or more mixers using the second reference signal, having the second carrier or LO frequency.

Figure 2B:
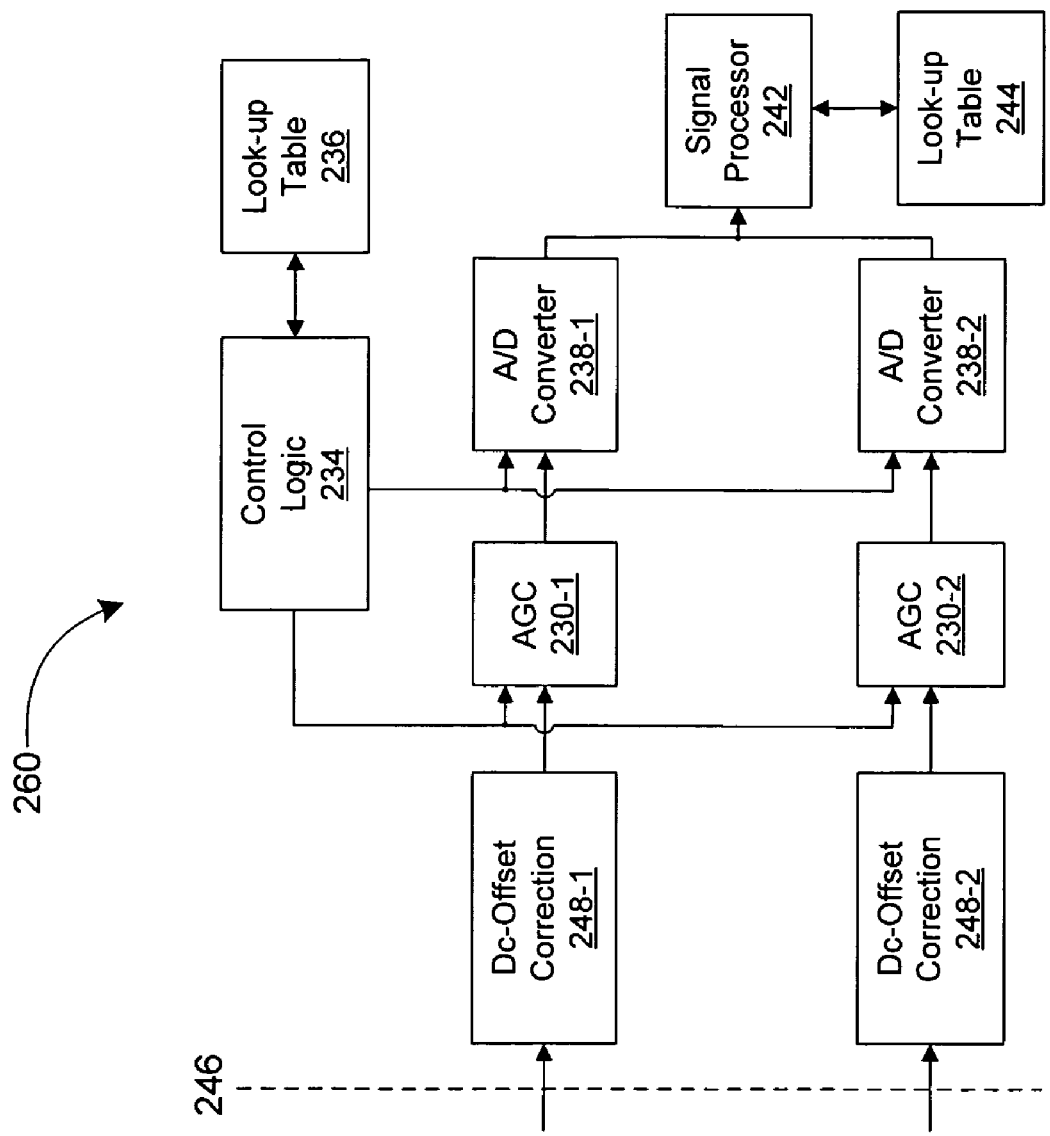
FIG. 2B is a block diagram illustrating components in a channel in a GNSS receiver.

FIG. 2B illustrates an embodiment of a sub-channel circuit 260. Vertical line 262 corresponds to a detection circuit 246 in FIG. 2A. For proper performance of the sub-channel circuit 260, equal numbers of positive and negative A/D samples from A/D converters 238 are desired. If the A/D samples do not average to zero, they contain a bias, also called a DC bias, that during a code correlation process (332 and 334 in FIG. 3) will be converted to additional interfering noise, or, if the DC-bias is larger than an auto-correlation protection provided by a respective spread-spectrum code, will appear as an interfering satellite signal. DC-offset correction circuits 248 adjust the I and Q signals near baseband to reduce a DC bias in one or both of these signals.

One approach for removing DC-bias is to average the A/D samples for a period and subtract the resulting average from the incoming A/D samples. This approach, however, may use many bits of precision in the de-biased A/D samples, and consequently many bits of precision during signal processing 242. Other methods include hand or software calibration of the DC-biases. These methods measure the DC-bias and adjust A/D reference voltages or thresholds by manually adjusting components in the sub-channel circuit 260 or providing a variable feedback voltage using a digital to analog (D/A) converter. In some embodiments, counters coupled to opamps may be used to determine a number of positive and negative samples from the A/D converters 238 and to adjust a reference voltage such that there are equal numbers of positive and negative samples and a mean of the I and the Q samples is zero. The opamps and their associated feedback circuitry are selected so that an integration time of pulses is between 100 ms and 10 s.

The A/D converters 238 have several embodiments for converting one or more GNSS signals from analog to digital form. As is known in the art, a respective sampling rate equal to or greater than a Nyquist rate is acceptable. In embodiments where complex samples are used, the sampling rate may be greater than or equal the bandwidth of the filters 226

(FIG. 2A). For example, for GPS signals the sampling rate may be greater than 32 MHz. In other exemplary embodiments, the sampling rate may be 40, 60 or 80 MHz. Since power consumption and timing constraints during signal processing increase in proportion to the sampling rate, a 40 MHz sampling rate may be suitable for existing and planned GNSS signals. If future, higher-bandwidth GNSS signals become available, the bandwidth of the filters 226 and the sampling rate of the A/D converters 238 may be increased accordingly based on the new Nyquist rate.

In some embodiments, one or more sub-channel circuits, such as sub-channel circuit 260, in the first channel may be configurable to output one or more digital signals having an adjustable or configurable number of bits. The number of bits may be 1, 2, 3, 4 or 5, including 1-bit (2-level) quantization, 2-bit (3-level or a sign and a magnitude, i.e., 1, 0 and −1) quantization, 2-bit (4-level) quantization and 3-bit (8-level) quantization. In some embodiments, a larger number of bits may be used. However, a complexity of an A/D converter, such as the A/D converters 238 varies as a square of the number of bits and there may be diminishing returns as the number of bits is increased beyond 5. The number of bits may be dynamically configured or adapted. The configuring and/or adapting may be controlled by the controller in the receiver and/or a controller in at least one of the sub-channel circuits, such as sub-channel circuit 260. The A/D conversion may use one or more mappings stored in a look-up table, such as the look-up table 236. A respective mapping may be implemented by the control logic 234. In embodiments where one or more sub-channel circuits are configured to output digital signals having 1 bit, one or more of the A/D converters 238 may be replaced with a comparator. In addition, in using 1-bit quantization in A/D converters 238, feedback in AGC 230 may not be needed.

Since the information content of the StarFire Network signal (1200 or 2400 bits per second) is much smaller than for the GNSS signals, a lower sampling rate may be used, such as 38.4 kHz. This rate is 16 or 32 times the Nyquist rate and facilitates possible future increases in a broadcast data rate. It also allows synchronization of data bit edges with asynchronous digital samples without a significant loss of signal power.

Samples from one or more sub-channel circuits, such as sub-channel circuit 260, may be processed in signal processor 242. In some embodiments, more than one sub-channel may couple samples to the signal processor 242. In some embodiments, there may be more than one signal processor, and the signal processor may be used cooperatively such that the signal processors function as a single signal processor. Samples from the respective sub-channel circuit, such as sub-channel circuit 260, may be routed to more than one of the signal processors.

Signal processing may be implemented in analog circuits, digital circuits or a combination of analog and digital circuits. With the exception of the A/D converters 238, operations may be performed using hardware, such as an application specific integrated circuit (ASIC), software or a combination of hardware and software.

Figure 3:
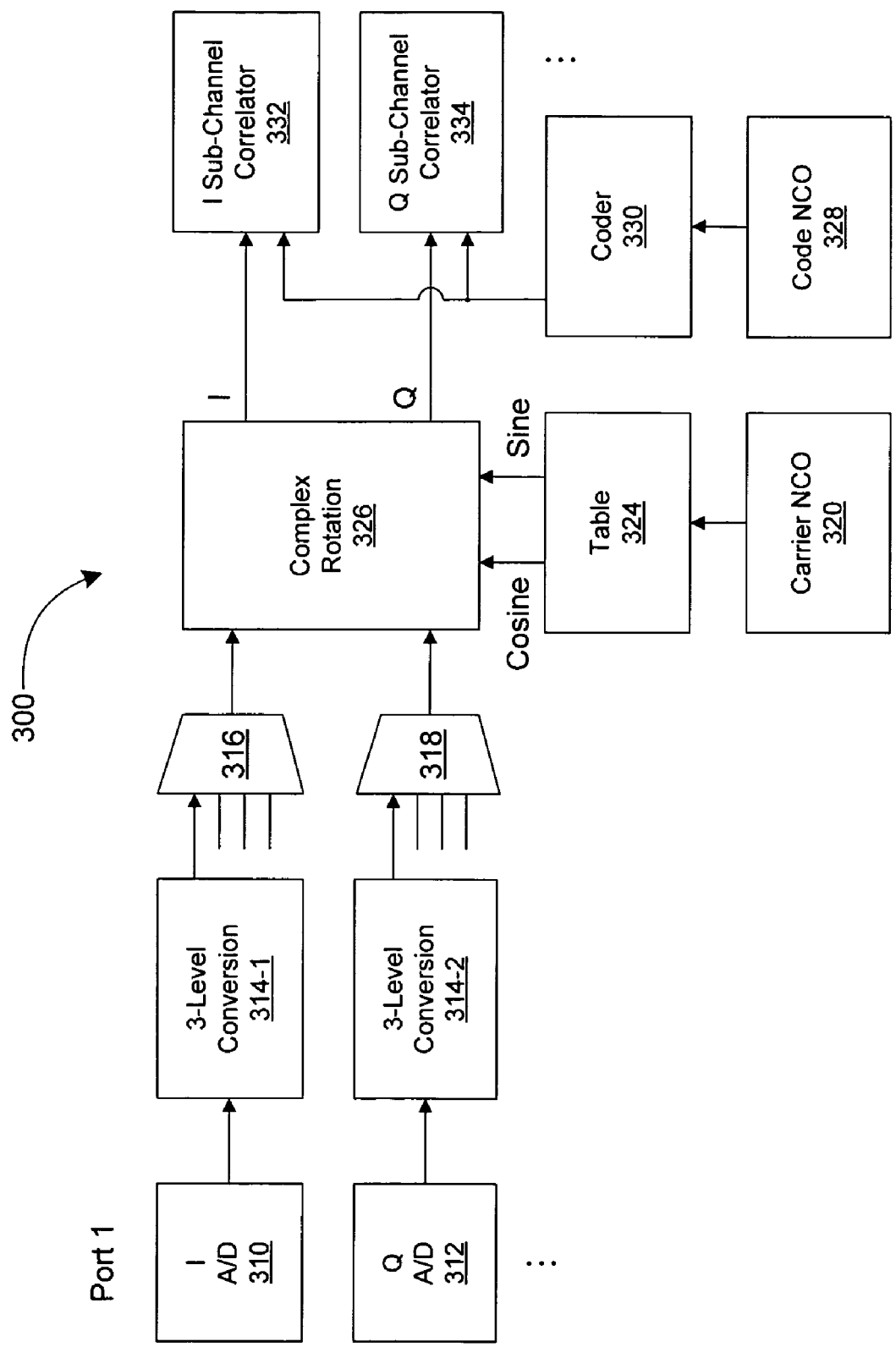
FIG. 3 is a block diagram illustrating components in a GNSS receiver.

FIG. 3 illustrates an embodiment of a signal processor 300, such as the signal processor 242 (FIG. 2A). A/D converters 310 and 312 provide I and Q samples, respectively. The A/D converters 310 and 312 are a first port to the signal processing circuit 300 for at least the respective sub-channel circuit. Thus, the first port corresponds at least to the respective sub-channel receiving data at a single carrier signal frequency in the signal. There may be one or more additional ports from additional sub-channel circuits coupled either to the signal processing circuit 300 or additional instances of the signal processing circuit 300. In embodiments with a multi-frequency antenna, a separate sub-channel and port may be used for each carrier signal frequency in the signal. In embodiments with multiple antennas, such as in an attitude determination system, a separate port may be needed for each carrier signal frequency in the signals from each antenna.

The I and Q samples are coupled to 3-level converters 314, which perform a mapping from a number of bits in the I and Q samples to a sign and a magnitude. In some embodiments, the 3-level converters 314 may be implemented using a circuit or a look-up table, such as the look-up table 244 (FIG. 2A). The samples are coupled to multiplexers 316 and 318, which couple the remainder of the signal processing circuit 300 to at least one of the ports.

Referring to FIG. 2A, the reference signals from the quadrature signal generator 224 may not be exactly 90° out of phase. If the signal is down converted to baseband, a phase error or bias, and a corresponding signal processing loss, results. As a consequence, conventional receivers typically do not use quadrature detection and sampling as illustrated in FIG. 2A. In addition, sampling and quantization is usually typically not at baseband. Instead, sampling and quantization may typically be performed at a residual IF, such as a quarter of the sampling rate of an A/D converter, such as A/D converters 238. By increasing the sampling rate of the A/D converter and averaging samples, the residual bias may be removed. In essence, the A/D converter in these conventional receivers down converts the signal to baseband. However, the resulting I and Q samples are determined over a time interval. This may make correction of multi-path signals, such as the multi-path signal 116 (FIG. 1), more difficult. There may also be a power penalty associated with the increased sampling rate of the A/D converter. In those conventional receivers that implement a down conversion directly from radio frequencies to near baseband, quadrature detection is usually not used.

In the receiver in device 110 (FIG. 1), the signal is down converted to substantially near baseband and, as previously described in the discussion of the sub-channel circuit 200, may be sampled and quantized in quadrature. This detection approach allows I and Q samples to be determined substantially simultaneously. This, in turn, may allow improved correction of the multi-path signal 116 (FIG. 1) and lower power consumption. There is, however, still the issue of possible residual bias associated with phase errors in the reference signals from the quadrature signal generator 224. Down converting to substantially near baseband offers a solution. As noted previously, the resulting signal effectively has an intentional Doppler frequency shift. A complex phase rotation may be performed during signal processing 242 to correct for this intentional Doppler frequency shift. In the process, the corresponding bias is substantially uniformly distributed over 0-360° and averages to zero.

Referring back to FIG. 3, the complex rotation to correct for the residual bias and the intentional Doppler frequency shift associated with down conversion to substantially near baseband is performed in complex rotation circuit 326 (for example, by forcing the Q samples to equal 0). As discussed further below, the complex rotation may be based on a value in look-up table 324. The value is determined based on a carrier signal generator or NCO 320, which is part of a carrier or phase tracking loop that determines the intentional Doppler frequency shift to be corrected. At least the one spread-spectrum code in the samples of the signal is de-modulated in the correlators 332 and 334 based on a coder 330 and a code signal generator or NCO 328, which is part of a code tracking loop. The I and Q accumulations from the subchannel correlators 332 and 334 are output at a measurement time to signal processing software where the accumulations may be used to compute feedback for the phase and code tracking loops.

As discussed previously, the correlation operations in effect mix the satellite signal embedded in the I and Q samples with a replica of the signal generated by the respective channel. If the phase, frequency and timing of the replica signal substantially duplicate those received from the satellite, a power accumulated by the sub-channel correlators 332 and 334 is maximized. If there are timing errors in the replica signal, the power accumulated by the correlators 332 and 334 is reduced if the timing of the code is in error by less than one spread-spectrum code bit, or is zero if the error is greater than or equal to a spread-spectrum code bit.

The rotation and correlation operations occur at the sample rate, so there is very little SNR loss due to signal processing. An order of the rotation and correlation operations is arbitrary. Therefore, in some embodiments, correlation may be performed before rotation, rotation may be performed before correlation or the operations of rotation and correlation may be combined into a single operation. In an exemplary embodiment, rotation is performed before correlation. This allows one rotation per I and Q sample pair to be performed. There are, however, many possible correlations, including one set per sub-channel.

As shown in FIG. 3, the I and Q samples from one or more sub-channel circuits, such as the sub-channel circuit 200 (FIG. 2A), are mixed with a carrier signal component of the reference signal for the respective channel by the complex rotation 326 of the I and Q samples. Rotated samples $I_R$ and $Q_R$ are generated using $$I_R = I \cdot \cos(\text{NCO}) - Q \cdot \sin(\text{NCO})$$

$$Q_R = I \cdot \sin(\text{NCO}) + Q \cdot \cos(\text{NCO}),$$

where NCO represents a value from the table 324 based on the carrier NCO 320. The carrier NCO 320 maintains the phase of the reference signal for the respective channel, such as the first channel. In some embodiments, the phase of the reference signal or the carrier phase is integrated using a phase accumulator. A carrier phase angle is assumed to be zero when the phase accumulator is started for a respective channel at a respective reference oscillator clock edge. In actuality, the phase is not zero at the start time, but the corresponding tracking error will be reflected in the I and Q samples. Carrier phase tracking will correct the reference phase angle. Due to the previously discussed intentional frequency offset of the reference oscillator, there is an initial positive Doppler carrier phase angle.

As discussed previously, there are a large number of carrier signal frequencies and spread-spectrum codes being used or planned for various GNSSs. A brief overview of various spread-spectrum codes proposed and/or used in different GNSSs is provided below. Additional details are summarized in the Appendix.

The GNSS satellites provide navigation signals that use many different families of spread-spectrum codes. All of these spread-spectrum codes, except a GPS P-code, are based upon maximal sequence (M-sequence) spread-spectrum codes of various lengths, in which a respective length defines a repetition period for a respective spread-spectrum code. In addition, several of the spread-spectrum codes have additional complexity.

The C/A code in the GPS SBAS and QZSS GNSSs is broadcast on carrier signals having the L1 carrier signal frequency. The GPS satellites reportedly have the ability to broadcast C/A code on carrier signals having the L2 carrier signal frequency instead of P(Y) but currently do not do so. The C/A codes are defined (Navstar GPS ICD-GPS-200, ARINC Research Corporation) as the exclusive- or of two 10-bit Galois Field maximal polynomials, i.e., CA=G1⊕G2, where $$G1 = 1 + X^3 + X^{10}$$

and $$G2 = 1 + X^2 + X^3 + X^6 + X^8 + X^9 + X^{10}.$$

Figure 4:
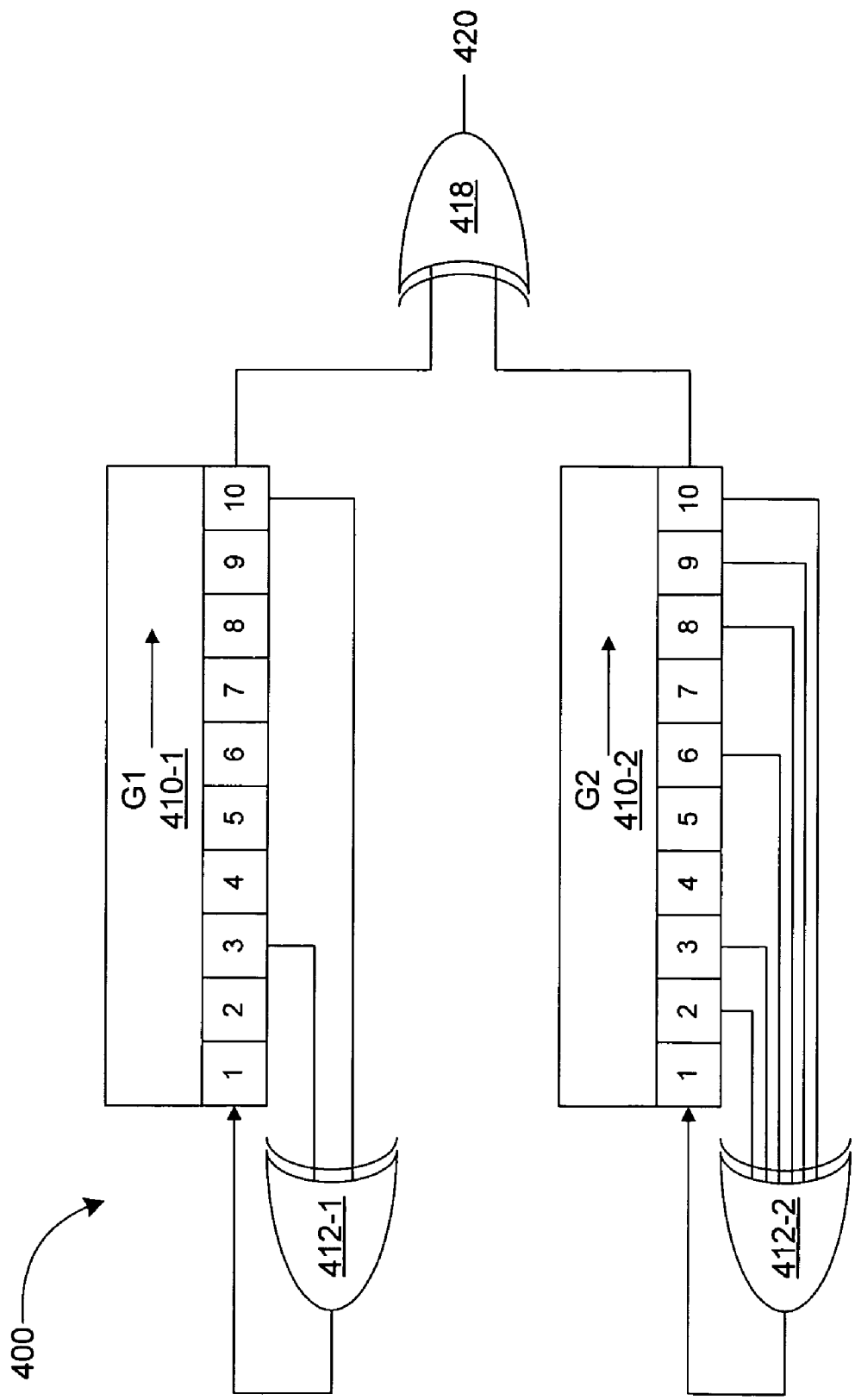
FIG. 4 is a block diagram illustrating a coarse acquisition (C/A) code generator.

As illustrated in FIG. 4, generation of spread-spectrum codes is often implemented using shift registers, such as shift registers 410. In embodiment 400, a power n of a respective X variable in the Galois Field polynomials corresponds to a shift register stage number that contains a feedback bit from n bit times previous. Bit 10, the oldest bit, is an output of the shift register 410. Each bit time the registers are right-shifted and the exclusive- or 412 of selected bits (bit position is prior to shift) is fed back into bit 1. An exclusive- or 418 of outputs from the shift registers 410 produces an output 420, which is a sequence corresponding to the C/A code.

For the C/A code, both of the shift registers 410 have an initial state of all ones, i.e., 3FF hexadecimal. Each of the shift registers 410 produces a different sequence of register values that contains all 1023 unique 10-bit non-zero integers. Both of the shift registers 410 automatically recycle to their initial state at the $1024^{th}$ code bit. Therefore, the C/A code has a length of 1023 bits ($2^{10}-1$) or corresponding clock cycles.

An initial state of G1 shift register 410-1 is synchronized with a code edge of a GPS millisecond epoch. In some embodiments, rather than taking the exclusive- or of specified stages in the G2 shift register 410-2 (as described by the GPS ICD 200) the initial state of the G2 shift register 410-2 may be delayed with respect to the millisecond epoch by a different number of code bits for each different satellite code (this is the method used to define C/A codes in the SBAS GNSS). Using either approach, the exclusive- or 418 of the shift registers 410 produces a unique C/A code for each satellite.

A delay of the G2 shift register 410-2 may be chosen such that the resulting C/A code 420 has a balance between ones and zeros (there are an odd number of bits in the sequences, so there must be one extra 0 or 1 for each C/A code). Corresponding cross correlation and autocorrelation side lobes of the C/A codes are, therefore, minimized. This group of codes is called a Gold Code family. The GPS GNSS uses 37 Gold Codes, called PRN 1 through 37. The first 32 of these codes are used by the GPS satellites and the other 5 codes are reserved for testing. The SBAS GNSS use different C/A codes in the same Gold Code family for carrier signals having the L1 carrier signal frequency from different satellites. These codes are defined as PRN 120 through 138. The QZSS GNSS plans to use C/A codes for carrier signals having the L1 carrier signal frequency.

Satellites in the GPS GNSS also encode binary-shift-key (BPSK) data messages at 50 bits per second over the signals encoded with the C/A code. These messages use a Hamming parity check for error detection.

The GPS GNSS is in the process of adding two new public signals called L2CM and L2CL on carrier signals having the L2 carrier signal frequency. The polynomial describing the codes is $$P = 1 + X^3 + X^4 + X^5 + X^6 + X^9 + X^{11} + X^{13} + X^{16} + X^{19} + X^{21} + X^{24} + X^{27}.$$

Figure 5:
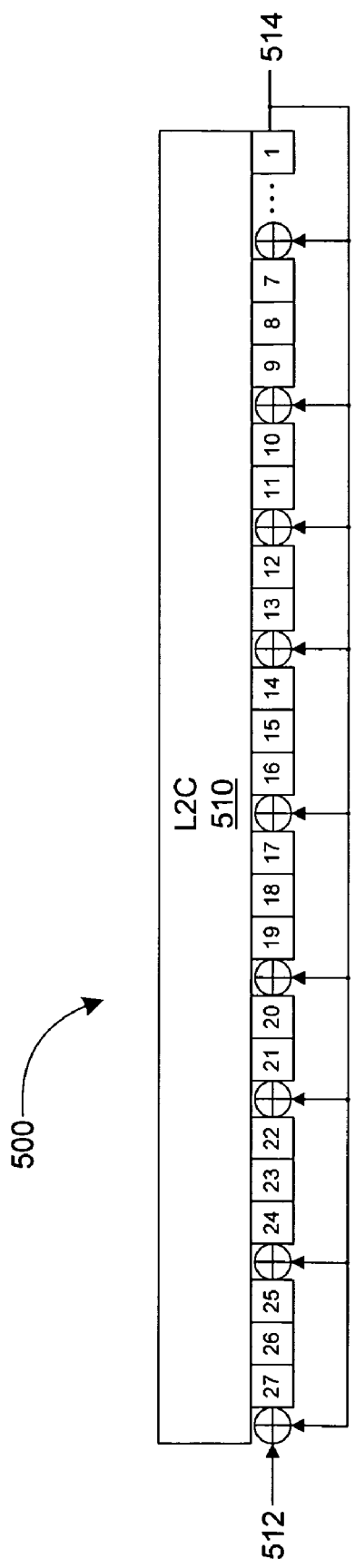
FIG. 5 is a block diagram illustrating a L2C code generator.

An embodiment 500 of a shift register 510 implementing the L2C codes is illustrated in FIG. 5. Embodiment 500 differs from embodiment 400 (FIG. 4) in several ways. There is only one 27-state shift register 510, instead of two 10-bit shift registers 410 (FIG. 4). The bits in shift register 510 are numbered from right-to-left in order to correspond to the X-delays in the polynomial. And for L2C feedback, an exclusive- or of an output bit from the shift register 510 is taken with several register bits (multiple-bit feedback as opposed to single-bit feedback in FIG. 4).

Figure 6:
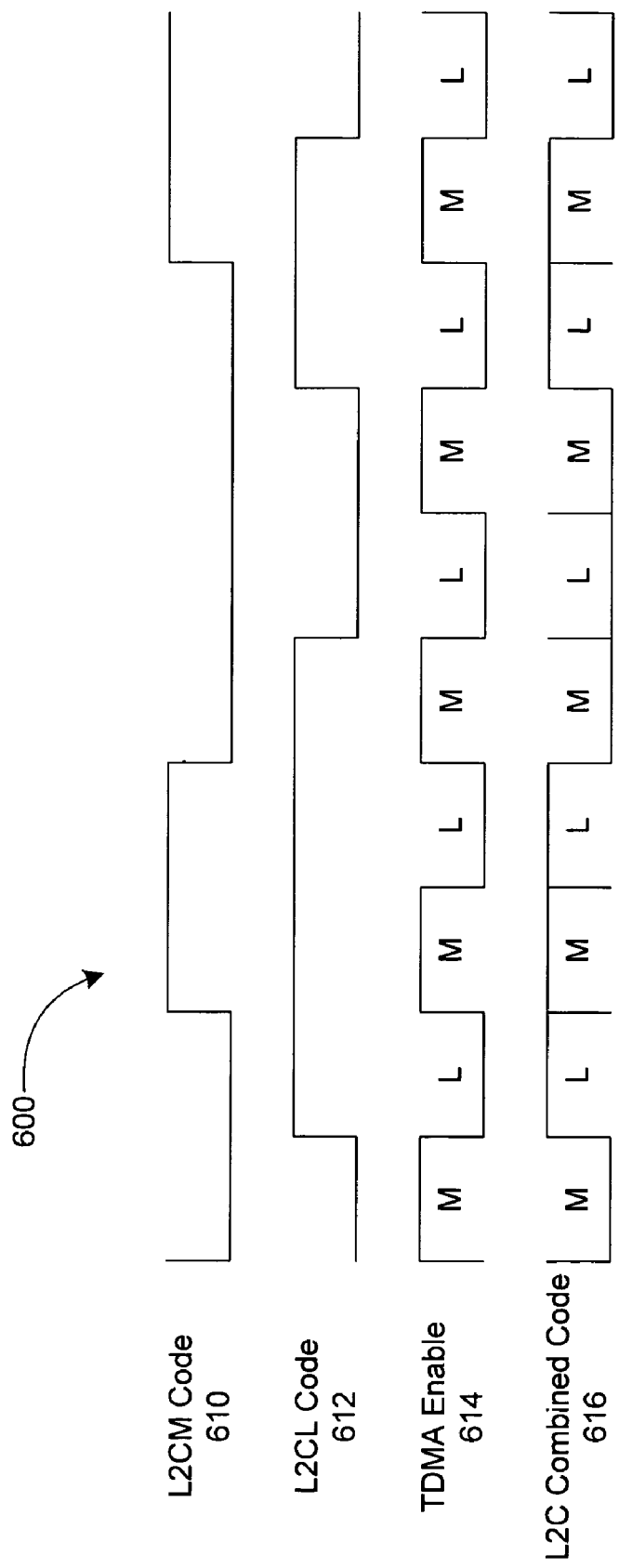
FIG. 6 is a timing diagram illustrating time multiplexing of L2C codes.

L2CM (for civilian use, medium length code) and L2CL (for civilian use, long length code) use a 0.5115 Mz code rate and are 50% time multiplexed with each other. As illustrated in embodiment 600 in FIG. 6, an L2CM code signal 610 is broadcast the first half of each 0.5115 MHz clock and an L2CL code signal 612 is broadcast in the second half of the clock. The L2CM code signal 610 and the L2CL code signals 612 are combined using time domain multiple access (TDMA) enable signal 614. The TDMA enable 614 alternately selects the L2CM code signal 610 (M in FIG. 6) and the L2CL code signal 612 (L in FIG. 6). The TDMA enable 614 switches between the code signals 610 and 612 at a 1.023 MHz rate with a 50% duty cycle for each code producing L2C combined code signal 616. A bit-edge rate of the L2C combined code signal 616 is 1.023 MHz, and it alternates half bits of the L2CM code signal 610 and the L2CL code signal 612.

The L2CM code has a length of 10230 bits and repeats every 20 ms. The L2CL code has a length of 767250 bits long and repeats every 1.5 seconds. Both codes are subsets of a single M sequence having a length of $2^{27}-1$ bits (greater than 134 million bits). The codes differ only by a state of the shift register 510 (FIG. 5) at a start of a code sequence. A unique start state for each L2CM code and L2CL code is assigned for every satellite (PRN number). Since the codes are only a portion of the complete M-sequence, the sequence for the L2C combined code does not automatically repeat as is the case for the C/A code. The L2C combined code must be restarted by either detecting a final code state or counting an appropriate number of code bits. At the start of each code period, the shift register 510 (FIG. 5) is reset to the initial state.

Data messages are also modulated onto the L2CM code signals 610 at a rate of 25 bits per second. A rate ½, constraint or run length 7 convolution code is used, so a symbol rate is 50 symbols per second. The L2CL code signal 612 is not modulated, i.e., it does not contain additional data. As a consequence, the L2CL signal 612 may be tracked with a phase lock loop (such as used by the carrier NCO 320 in FIG. 3), rather than a Costas loop (a phase tracking loop where a sine term I is normalized by a cosine term Q to track data bits), which is often used with signals having modulated data messages. In some embodiments, the L2CL signal 612 may be tracked with a Costas loop. A lock threshold is 6 dB better for the phase lock loop. The signal may also be coherently integrated indefinitely to improve signal to noise in very weak signal conditions. In contrast, data modulated signals can only be coherently integrated for a length of a modulated data symbol before a hard decision about the modulation is required.

Figure 7:
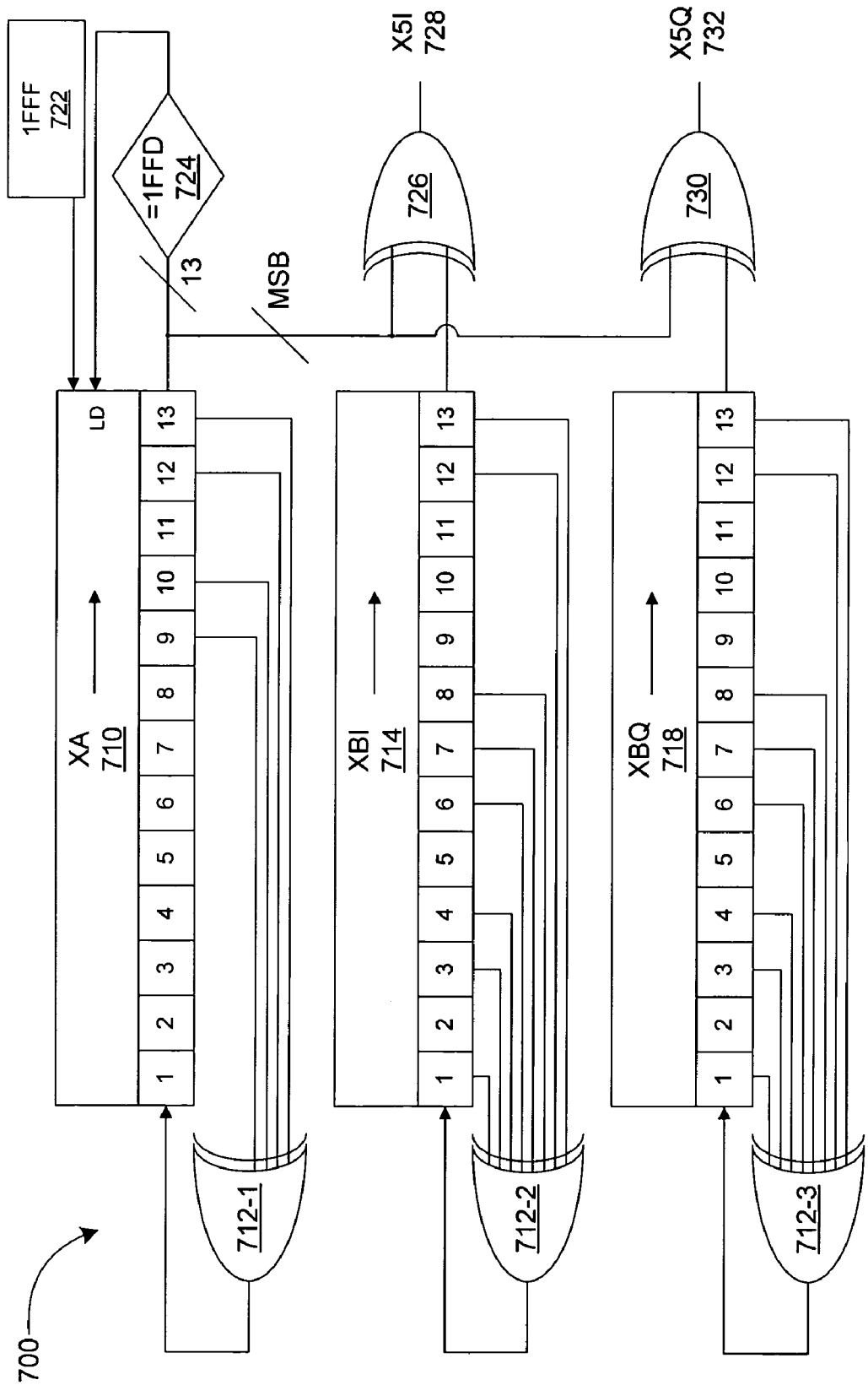
FIG. 7 is a block diagram illustrating an L5 code generator.

The GPS GNSS is also in the process of adding two new public carrier signals having the L5 carrier signal frequency. These two carrier signals are called X5I and X5Q and are broadcast simultaneously using signals having the L5 carrier signal frequency and including quad-phase shift key modulation (QPSK). X5I is modulated on in-phase portion of the carrier signal and X5Q is modulated on the quadrature portion of the carrier signal. As illustrated in embodiment 700 in FIG. 7, X5I and X5Q codes are generated from three 13-bit shift registers, XA 710, XBI 714 and XBQ 718. The same polynomial is used for XBI 714 and XBQ 718, $$P_{XB}=1+X+X^3+X^4+X^6+X^7+X^{12}+X^{13}.$$

XA 710 uses $$P_{XA}=1+X^9+X^{10}+X^{12}+X_{13}.$$

Single-bit feedback for each of the shift registers 710, 714 and 718 is provided by exclusive- or 712. An exclusive- or 726 of an output from shift registers 710 and 714 produces X5I 728. An exclusive- or 730 of an output from shift registers 710 and 718 produces X5Q 732.

Both X5I 728 and X5Q 732 have a bit rate of 10.23 MHz and have a length of 10230 bits or a 1 ms time period. Since 13-bit M-sequences only have a length of $2^{13}-1$ bits (8191 bits), the XA shift register 710 is short cycled back to its initial state one bit early, when it reaches its $8190^{th}$ bit, i.e., when the XA shift register 710 is equal to 1FFD hexadecimal. The XB shift registers 714 and 718 are not short cycled, which causes a precession of the two codes. This, in effect concatenates a second M-sequence of length 2040 bits to the end of the first 8190 bit sequence. Both XB shift registers 714 and 718 are short cycled back to their initial state after the $10230^{th}$ bit. The short cycles can be implemented by counting bits or by comparing the registers to their known final states. In some embodiments, therefore, one or more additional counters (such as one counting to 8190 and/or one counting to 10230) and/or one or more comparators (for example, comparing XA and/or XB registers to final states) may be included. In embodiment 700, a state of the XA shift register 710 is tested 724 and if a condition is met (equal to 1FFD) an initial state of 1FFF hexadecimal is set 722. In other embodiments, the short cycle may be implemented by counting bits. The initial state of the XB registers 714 and 718 is different for the X5I and X5Q codes and on each different satellite.

The X5I signal is modulated with 100 symbols per second, rate ½, constraint or run length 7 convolution code data. In addition, the 1-ms time-period X5I code sequences are further modulated with a 10-ms time-period (1 symbol period) Neuman-Hoffman code that is equal to 035 hexadecimal for a zero-symbol and 3CA hexadecimal for a one-symbol. The Neuman-Hoffman code in effect lengthens the spread-spectrum code without a significant penalty during signal acquisition.

The X5Q signal is also modulated with data, but the X5Q code is lengthened by a superposition of a 20-ms time-period, 20-bit Neuman-Hoffman code equal to 04D4E hexadecimal to improve the length of the spread-spectrum code without significant additional cost to signal acquisition. The X5Q code does not have additional modulation, i.e., it does not carry additional data. It can be tracked using phase lock techniques, such as the phase lock loop, or with a Costas loop, which is often used for signals with modulated data. The phase lock loop provides an additional 6 dB of lock threshold sensitivity. The data-free codes can also be coherently integrated indefinitely to improve signal acquisition in weak signal environments.

All satellites in the GLONASS GNSS use a common 9-bit spread-spectrum code for their public codes on carrier signals having either the L1 or the L2 carrier signal frequency. Currently, only carrier signals having the L1 carrier signal frequency are available to public users. GLONASS has announced, however, plans to provided carrier signals having the L2 carrier signal frequency that use the same code. In the GLONASS GNSS, signal diversity is achieved by using FDMA, i.e., a different broadcast carrier signal frequency for each satellite. The polynomial for the GLONASS codes is $P(X)=1+X^5+X^9$.

Figure 8:
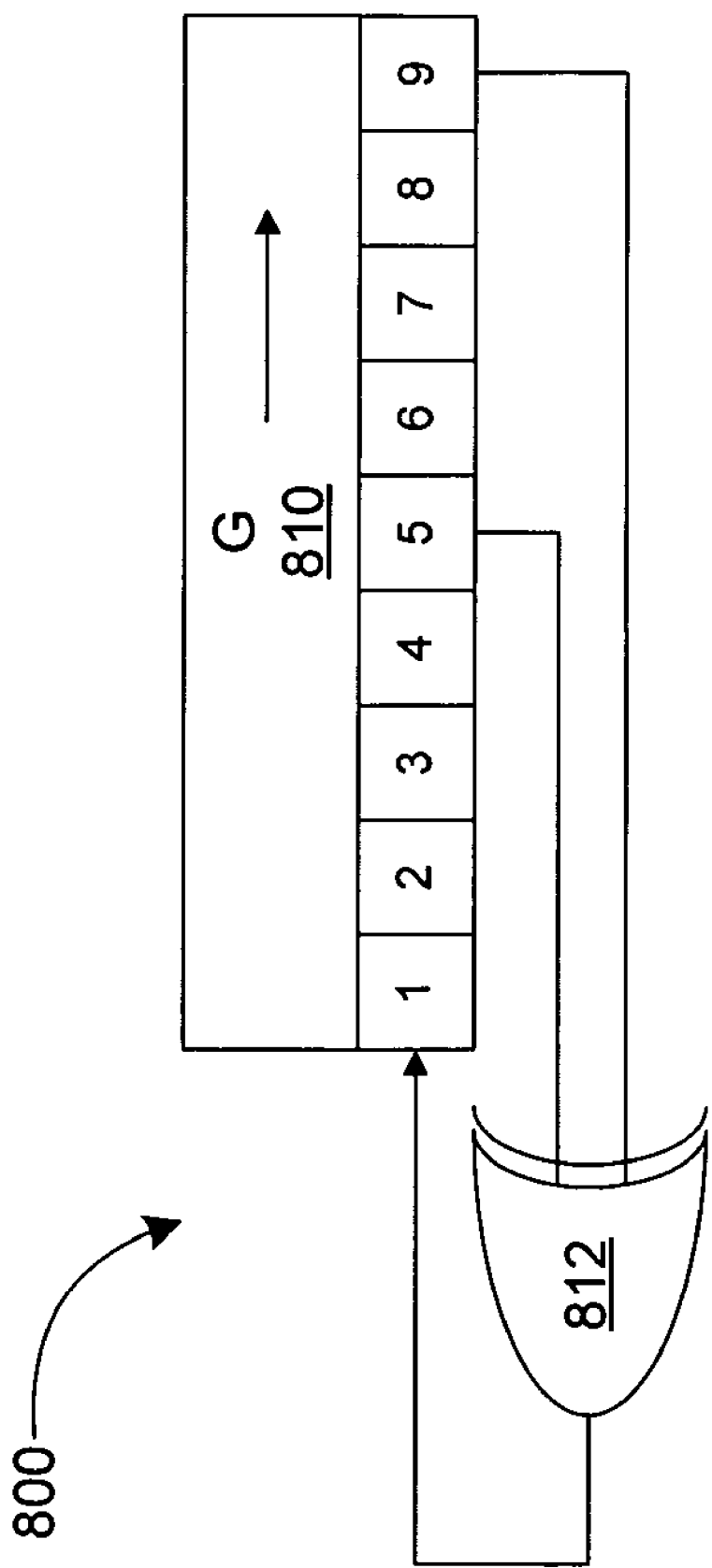
FIG. 8 is a block diagram illustrating a code generator.

FIG. 8 illustrates an embodiment 800 of a shift register 810 with exclusive- or 812 providing a single-bit feedback for generating this code.

The GLONASS code has a length of 511 bits long and naturally restarts every 511 bits. The code rate is 0.511 MHz, so the repetition rate is 1 ms. Fifty bits per second BPSK data messages are modulated on the coded signals. A Manchester modulation code is used for the data bits.

The GLONASS satellites use FDMA to prevent mutual interference. Each satellite broadcasts signals using a carrier signal having a different carrier signal frequency. Two satellites that occupy the same orbit may share a frequency if they occupy positions on the opposite sides on the Earth. The GLONASS frequencies are numbered from −7 to 13. The formula for each channel's frequency in MHz is $L1_k = 1602 + k \cdot 0.5625$ and $L2_k = 1246 + k \cdot 0.4275$, where k ranges from −7 to 13. Until 2005 GLONASS plans to only use frequency channels 0 through 13. (1602 to 1609.3125 MHz on L1 and 1246 to 1251.6875 MHz on L2) Channels 0 and 13 are reserved for system testing. Starting in 2005, GLONASS plans to shift to lower frequencies and use channels −7 to +6 (1598.0625 to 1605.375 MHz on L1 and 2142.0375 to 1248.625 MHz on L2). Frequencies 5 and 6 will be used for testing.

WASS, EGNOS and MSAS GNSSs currently provide GPS-like C/A coded signals having the L1 carrier signal frequency. Discussions are underway to add service on the GPS L5 carrier signal frequency for WASS satellites, but the codes have not been finalized.

Satellites in the SBAS GNSS modulate the C/A coded signals with BPSK-encoded, 500-symbols-per-second data messages. A rate ½, constraint or run length 7 convolution code is used, so the data rate is 250 bits per second.

The QZSS GNSS plans to use 3 or more satellites with highly elliptical orbits to insure that at least one of the satellites is always visible at very high elevations in Japan. These satellites will broadcast signals having the L1, L2 and L5 carrier signal frequencies that are identical to the corresponding GPS signals.

A fourth QZSS experimental signal is also planned for the GALILEO E6 carrier signal frequency. A binary offset code BOC(14,2) code is being considered, but the specifications has not been finalized. BOC codes are discussed below.

The GALILEO GNSS (as well as some possible future GPS codes) uses codes that superimpose various types of binary offset codes (BOC) over the spread-spectrum codes. GALILEO plans to provide up to 10 signals having the L1, L5 (E5A and E5B) and E6 carrier signal frequencies. Some of the signals will be available to the public, some will be pay for use and some will be reserved for authorized users. Definitions of the codes used by GALILEO are not finalized. Some of signals use BPSK or QPSK encoding like GPS and some of them use BOC. A variety of code generation techniques are being considered for Galileo signals including M sequence spread spectrum codes and codes that can not be generated algorithmically. The code-bit sequences of non-algorithmic codes must be stored in the receiver's memory and be recalled bit-by-bit as signal correlation is performed.

BOC is the exclusive- or combination of a BPSK code and a square wave. The classic Manchester modulation code is a BOC code with one square wave cycle per BPSK data bit. It has become customary to categorize the rates of the square waves and BPSK codes used by the GNSSs with the notation of BOC(A,B), where A is a number of square waves cycles per 1.023 MHz period and B is a number of BPSK bits per 1.023 MHz period. The BOC codes that are being considered by the various GNSSs include BOC(1,1) for the GALILEO public signal having the L1 carrier signal frequency, BOC(10, 5) for the GPS military signals having the L1 and L2 carrier signal frequencies, BOC(14,2) for the QZSS signal having the L6 carrier signal frequency, BOC(15,X) for high-precision pay-for-use signals having the E5A and E5B carrier signal frequencies and BOC(15,2.5) for the GALILEO Public Regulatory (authorized use only) signal having the L1 carrier signal frequency.

One reason that BOC codes are used is to minimize inter-signal interference. For example, power spectra for GPS C/A and P coded signals have a primary peak centered on the L1 carrier signal frequency and a null for frequencies on either side at the code repetition rate (1.023 MHz for the C/A code and 10.23 MHz for the P code). Small side lobes recur at the code repetition rate. Superimposed square waves in BOC codes split the signal power equally between two lobes that are offset from a central carrier signal frequency by a repetition rate of the square wave. In the case of the GALILEO BOC(1,1) code, the two BOC signal power peaks are displaced by approximately 1 MHz from the carrier signal frequency and there is a null at the central frequency. As a consequence, the BOC signal power peaks lay directly over the C/A code signal power nulls and the BOC null is coincident with the C/A code signal power peak. Thus, interference between GPS and GALILEO signals is minimized.

Figure 9:
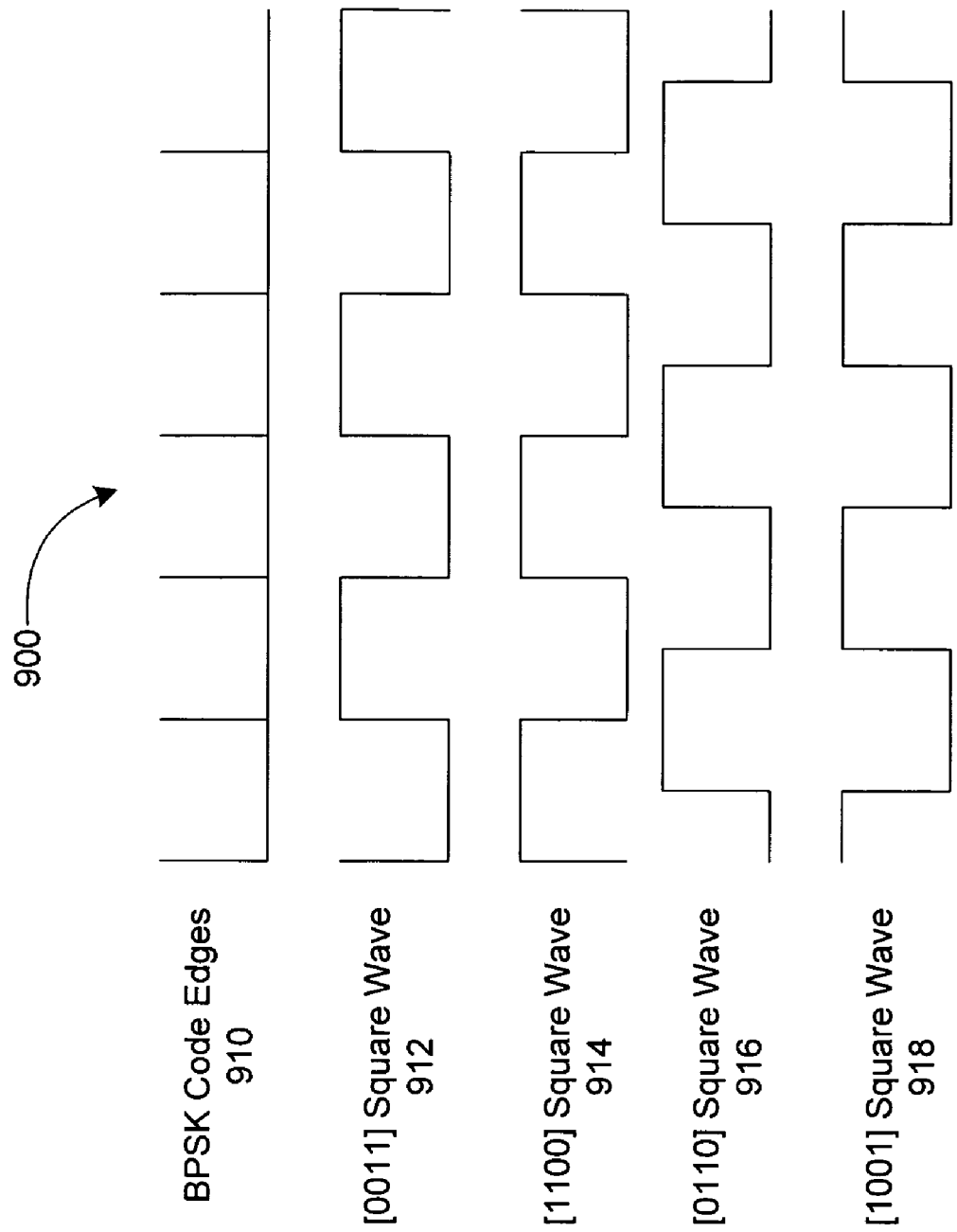
FIG. 9 is a timing diagram illustrating binary offset code (BOC) square wave forms.

BOC codes and tracking of the BOC codes use square waves with several different phase relationships with respect to a start of a BPSK bit edge. Four types of relative relationships where a start of the square wave edge lags the start of the BPSK bit edge by 0, 90, 180 or 270° (in a square wave cycle) are the most common. These four possible phase relationships are henceforth referred to as [0011], [0110], [1100] and [1001], where the ones and zeroes define a relative phase and polarity of the BOC wave with respect to the BPSK bit edge. FIG. 9 illustrates an embodiment 900 of a timing diagram for BOC(1,1). The discussion, however, is applicable to any BOC code with an integer number of square waves per BPSK bit. Leading edges of [0011] square wave 912 and [1100] square wave 914 are in phase with BPSK code edges 910. The [0011] square wave 912 is low for the first half of a square wave period while the [1100] square wave 914 is high for the first half. [0110] square wave 916 and [1001] square wave 918 are out of phase with the BPSK code edges 910 by one quarter of the square wave period. The [0110] square wave 916 is low for the first quarter of the square wave period, high for a next half and low for a final quarter. The [1001] square wave 918 is an inverse of the [0110] square wave 916.

The [0011] square wave 912 and the [1100] square wave 914 are "standard" BOC waveforms. There is, however, no strict convention for selecting one over the other and some drafts of BOC code specifications for GNSS satellites have neglected to define which one is to be used by the satellites. BOC codes based on the [0110] square wave 916 and the square wave 918 have also been called QBOC.

Figure 10:
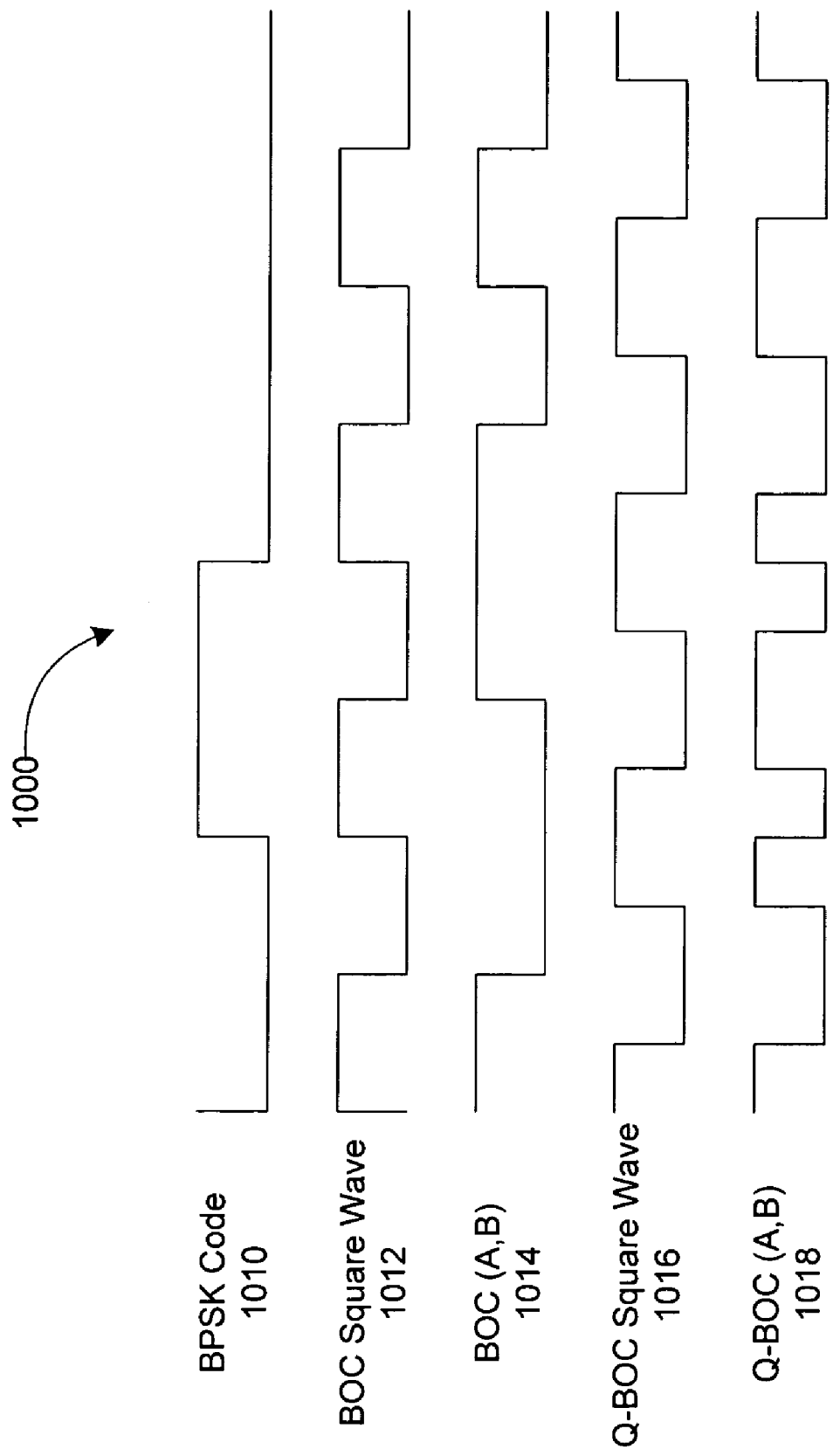
FIG. 10 is a timing diagram illustrating BOC and quadrature binary offset code (QBOC) square wave forms.

FIG. 10 illustrates an embodiment 1000 for combining a BPSK code with a square wave to produce a BOC(A,B) code, such as BOC(1,1) or BOC(2,2). BPSK code 1010 illustrates four bits of an A times 1.023 MHz BPSK coded signal. The four BPSK bits are 0-1-0-0. An exclusive- or of B times of a 1.023 MHz BPSK [1100] square wave 1012 with the BPSK coded signal 1010 yields a BOC(A,B) coded signal 1014. An exclusive- or of B times of a 1.023 MHz BPSK [1001] square wave 1016 with the BPSK coded signal 1010 yields a QBOC (A,B) coded signal 1018.

Figure 11:
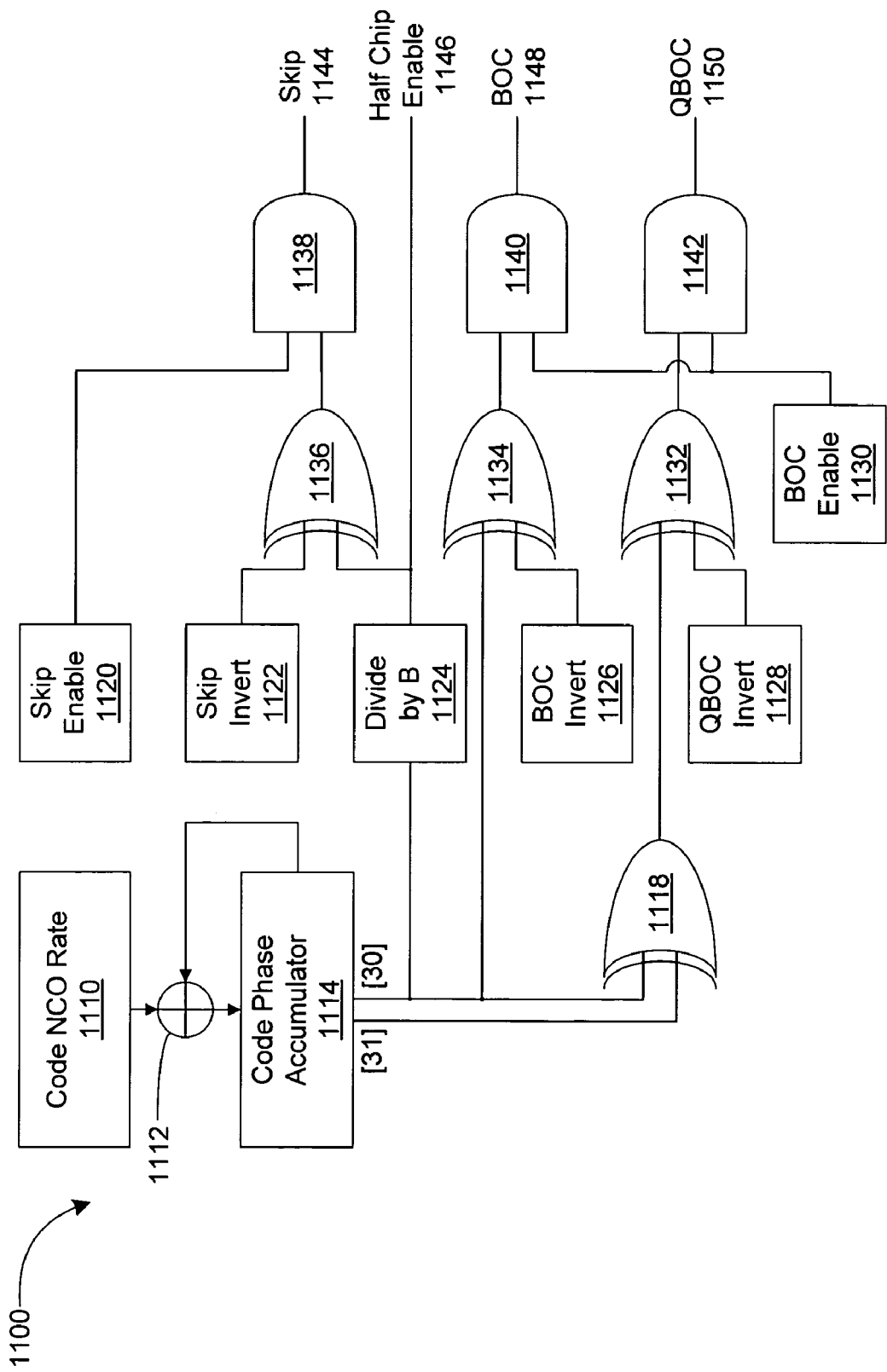
FIG. 11 is a block diagram illustrating a code signal and control signal generator.

Referring to FIG. 3, as discussed previously the phase, frequency and timing of the replica signal strongly influence the power accumulated by the correlators 332 and 334. The code tracking loop attempts to maintain these relationships between the replica of the signal and the received signal. FIG. 11 illustrates an embodiment 1100 of the code NCO 328. A code NCO rate 1110, is used as feedback to close the code tracking loop and to control timing of the codes. The feedback is a sum of the code bit rate and the Doppler. Typically, the code tracking loop is tightly aided by a relatively wide carrier tracking loop. High frequency dynamics are tracked by the wider carrier tracking loop. A narrower (less noisy) bandwidth may be used for the code tracking loop. Any feedback update rate slower than once per ms may be used for the code NCO rate 1110. An appropriate update rate is a design parameter of the code tracking loop. For example, typical feedback rates are equal to about 1/10 of the loop bandwidth. Faster feedback rates increase processing load but may have little affect on loop performance. Feedback rates slower than 1/10 the loop bandwidth may loose lock or increase loop noise under dynamic conditions.

The code NCO 328 (FIG. 3) in the code tracking loop may substantially maintain the phase of the replica code generated in the receiver by integrating the code NCO rate 1110 using a summer 1112 and a code phase accumulator 1114. In some embodiments, the code NCO rate 1110 is the chip rate of the code in the received signal. Timing and enable signals for coder 330, which may generate BOC codes, QBOC codes, time-multiplexed codes, the M-sequence spread-spectrum codes, and/or may fetch non-algorithmic code bits from the receiver's memory, may be derived from the code NCO 328. For BOC codes, the code NCO rate 1110 is a bit rate of the square wave. A spread-spectrum code rate is obtained by dividing this bit rate by divide by B 1124. For simple spread-spectrum codes, the code NCO rate 1110 is the code bit rate and divide by B 1124 is one.

Three primary control signals may be generated by the Code NCO 328 (FIG. 3). These are half-chip enable 1146, BOC 1148 and QBOC 1150. Half-chip enable 1146 is a primary enable signal for the coder 330 and the sub-channels. BOC 1148 and QBOC 1150 are the square waves for BOC codes. BOC 1148 and QBOC 1150 may be inverted or disabled using exclusive- or gates 1132 and/or 1134, and registers 1126, 1128 and 1130.

A relative timing of the BOC square waves and M-sequence spread-spectrum codes may be programmed using divide by B 1124, which is the number of square waves per M-sequence code bit. In exemplary embodiments, for non-BOC codes divide by B 1124 is set to 1 and the BOC 1148 and QBOC 1150 signals are disabled. For BOC(1,1), BOC(2,2) or BOC(10,10), divide by B 1124 is set to 1. For BOC(10,5), divide by B 1124 is set to 2. For BOC(15,2.5), divide by B 1124 is set to 6. And for BOC(14,2), divide by B 1124 is set to 7. Together, the BOC square waves BOC 1148 and QBOC 1150 provide all 4 possible phases of the BOC square waves (as illustrated in FIG. 9). BOC 1148 may be configured to be either or [1100], while QBOC 1150 may be either [0110] or [1001]. Accumulations from the correlators 332 and 334 (FIG. 3) may also be configured to use either BOC 1148 or QBOC 1150 in order to implement signal processing techniques that use combinations of the BOC 1148 and QBOC 1150 square waves.

From the preceding discussion of the various spread-spectrum codes it is apparent that one or more coders, such as the coder 330 (FIG. 3), in the receiver may be implemented in one of two equivalent domains using shift registers. In the first domain, illustrated in FIGS. 4, 7 and 8, a modulo-2 single-bit feedback is implemented using an exclusive- or tree of multiple bits. This classic type of coder is referred to as a Fibonacci configuration. In the second domain, illustrated in FIG. 5, multiple feedback bits are used. Each feedback bit is the exclusive- or of the output bit and individual bits in the shift register. This type of coder is referred to as a Galois configuration. Either domain or coder type may be used to generate a given spread-spectrum code. An algorithm for transforming from one domain to the other is described below. This allows a single coder, such as the coder 330 (FIG. 3), to generate two or more of the spread-spectrum codes in the receiver.

Each of the various spread-spectrum codes used in GNSS signals are generated using one or two Galois Field polynomials. The L2C codes (FIG. 5) and the code (FIG. 8) used in the GLONASS GNSS use one polynomial and one shift register. The other spread-spectrum codes use two polynomials and create their code by taking the exclusive- or of two shift register outputs. There is, however, a wide variation in a size of the shift registers and the degree of Galois Field polynomial that generate the spread-spectrum codes.

The GLONASS GNSS uses one 9-bit register 810 (FIG. 8). In the GPS GNSS, the C/A code uses two 10-bit registers 410 (FIG. 4). The GPS L5 codes use two 13-bit registers 714 and 718 (FIG. 7) and the GPS L2C codes use a single 27-bit register 510 (FIG. 5). As discussed previously, the GPS L5 code (FIG. 7) has a length of 10230 bits, but the Galois Field polynomials and shift registers 710, 714 and 718 (FIG. 7) generate a sequence that has a length of 8190. As a consequence, 2040 bits from a second code of the same family are appended starting at the $8191^{st}$ bit to achieve the desired length.

Coders for all of the presented codes except the GPS L2C code use the Fibonacci configuration, with a single feedback bit to a "young" end of a given shift register. In the various examples of these coders, the young end of the shift register is on the left-hand side. In alternate embodiments, however, the young end of the shift register may be on the right-hand side. The feedback is created from the exclusive- or of several of the shift register bits. A many input exclusive- or in the coder is used to implement these codes. In contrast, the coder for the L2C code uses feedback that is created by taking the exclusive- or of the output bit and individual register bits. The feedback occurs at several different bit places simultaneously. Therefore, the L2C feedback is implemented with two-input, one-output exclusive- or gates. The exclusive- or gate used in the Galois configuration may be preferred to the many-input form used in the Fibonacci configuration, especially for very high speed codes. Note that the young end in the shift register 510 (FIG. 5) for the L2C code is on the right-hand side. In alternate embodiments, however, the young end of the shift register for the L2C coder, and other coders using the Galois configuration, may be on the left-hand side.

Galois Field polynomials that can not be factored produce maximal length sequences. As a consequence, such polynomials are also called irreducible or primitive polynomials. The corresponding sequences are called maximal sequences and the codes are also called M-codes. A non-repeating length of the bit sequence is $2^N-1$, where N is the degree of the polynomial. During generation of maximum length sequence, a content of the shift register, when expressed as N-bit integers, will take on all values from 1 to $2^N-1$, if the shift register is not short cycled.

Spread-spectrum codes created by taking the exclusive- or of two maximal length sequences (like many spread-spectrum codes in GNSSs) may be expressed as a polynomial that is a bit-wise multiplication (using modulo-2 addition, without carries) of the polynomials for the two maximal length sequences. The degree of the resultant polynomial is equal to a sum of the degrees of the multiplied polynomials. Alternatively, the degree of the resultant polynomial is equal to the sum of the degrees of the multiplied polynomials. For example, the C/A code is the exclusive- or of two codes defined by polynomials of degree 10 (as shown in FIG. 10). This spread-spectrum code may be implemented by a single polynomial of degree 20. The combined polynomial does not produce a maximum length bit sequence. It repeats after 1023 bits, just like the 10-bit C/A code polynomials.

A method, which is henceforth referred to as a Cahn transformation, for multiplying and combining polynomials is provided below. The C/A spread-spectrum code for PRN-1 is used as an illustrative example of the operations in the procedure. The operations are presented in an order. Nonetheless, in some embodiments the order of two or more operations may be changed, additional operations may be added, operations may be combined and/or operations may be removed.

In an example of the Cahn transformation, the C/A polynomials are expressed in binary form as N+1 bit integers with the 1 in a right-most (lease significant bit) and $X^N$ in bit-N from the right. Reversing the order of the bits yields $G1 = 1 + X^3 + X^{10} = 10010000001$ and $G2 = 1 + X^2 + X^3 + X^6 + X^8 + X^9 + X^{10} = 10110010111$.

Multiplying the polynomials bit-wise, as in normal multiplication but using exclusive- or (modulo 2) addition to add columns (discard carries), yields

```
       10110010111
       10010000001
       10110010111
      10110010111
      10110010111
  101001001001000010111.
```

Expressing the result in polynomial form, with the least significant bit as $X^{2N}$ and the left-most 1-bit is the 1 in the polynomial, yields C/A polynomial = $1 + X^2 + X^5 + X^8 + X^{11} + X^{16} + X^{18} + X^{19} + X^{20}$.

The bit sequence generated in this example repeats after 1023 bits, which is also the length of the C/A code G1 and G2 sequences. The initial state of the shift register is a first N-bits for a respective spread-spectrum code (the remaining bits are zero). The first bit goes into the right-most bit of the shift register. This bit corresponds to $X^N$. For the C/A spread-spectrum code PRN-1, the first 20 bits (from right to left) are (20th bit) 0010 1001 1100 0001 0011 (1st bit)=29C13 hexadecimal. The feedback bit for this new code form is constructed by taking the exclusive- or of all bits referenced by the polynomial. The feedback bit is shifted into the "youngest" bit on the left side of the shift register. For the C/A spread-spectrum code, the feedback is the exclusive- or of the shift register bits that correspond to non-zero polynomial $X^N$ terms: $X^2$, $X^5$, $X^8$, $X^{11}$, $X^{16}$, $X^{18}$, $X^{19}$ and $X^{20}$.

Feedback is written back to the $X^1$ position.

Using this procedure, two or more, or all of the coders in the receiver may be implemented with a single shift register. The polynomial for the L2C code is already in the correct form, but the appropriate feedback may be constructed based upon the polynomial as indicated in the procedure.

In some embodiments, the procedure may be implemented with the right-most bit in the shift register as the 1 bit and the left-most bit as the $X^N$ bit.

Figure 12:
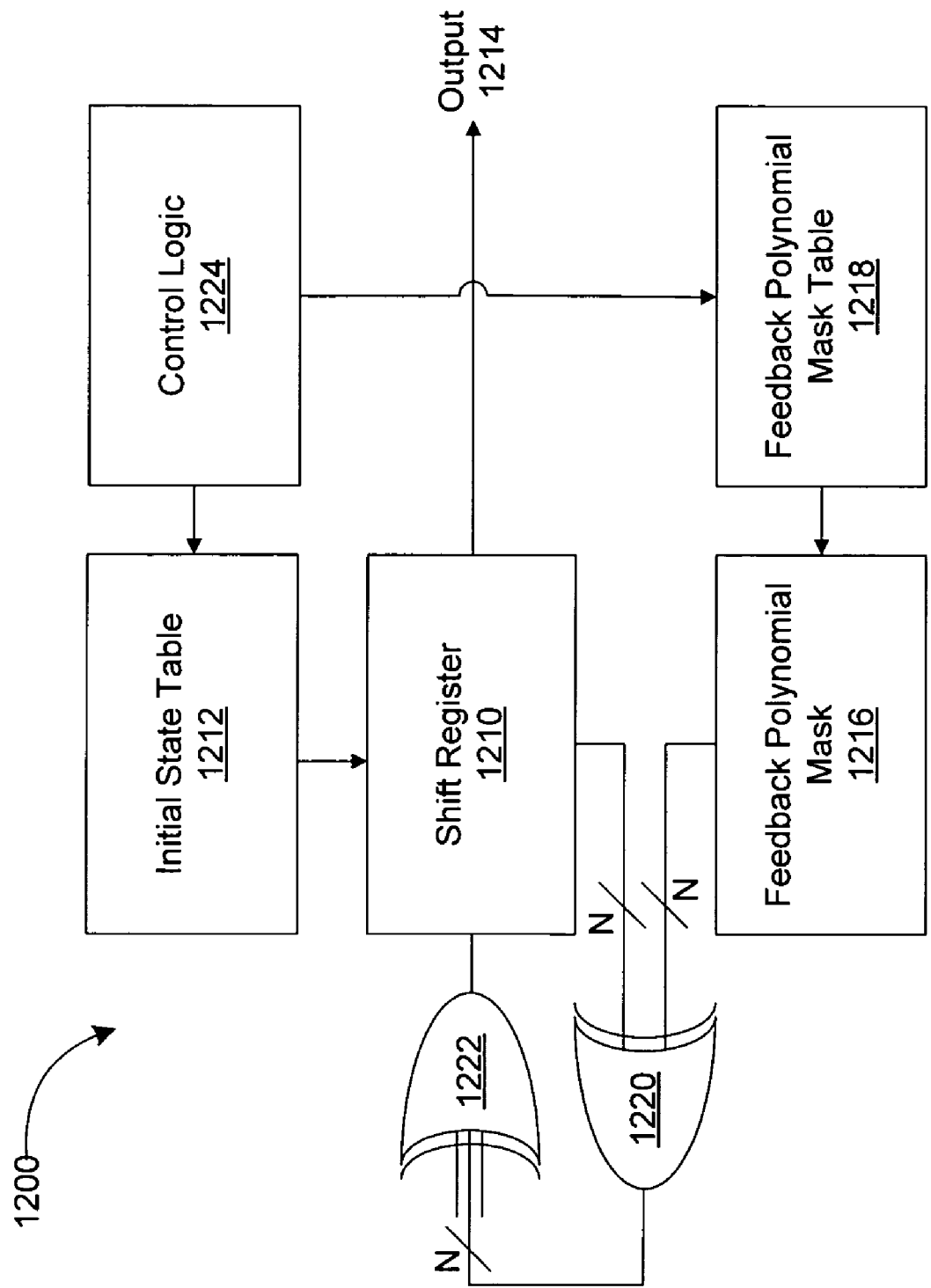
FIG. 12 is a block diagram illustrating an embodiment of a programmable code generator.

Once all of the spread-spectrum codes are transformed to a single-register form, a single coder that is capable of implementing two or more, or all of the GNSS spread-spectrum code bit sequences may be implemented. An embodiment 1200 illustrating such a coder is illustrated in FIG. 12. The coder in embodiment 1200 may be adapted, configured and/or programmed. Control logic 1224 selects a feedback polynomial mask 1216 (which is a binary representation of the code polynomial) for the spread-spectrum code to be generated from feedback polynomial mask table 1218. The feedback mask 1216 does not include the 1 in the corresponding polynomial. Bits from N-bit shift register 1210 and the feedback polynomial mask 1216 are combined bit-wise using a tree of two-input, one-output exclusive- or gates 1220 and 1222. The feedback bit is the exclusive- or of the N-bits of the results. In this implementation, the exclusive- or tree has a depth of approximately $\log_2(N)+2$. The tree may have considerable ripple-through delay before it settles to the correct result. For spread-spectrum codes such as GPS L5, an initial state for the shift register 1210 may be selected from initial state table 1212 using the control logic 1214. Output 1214 corresponds to the desired spread-spectrum code signal.

Figure 13:
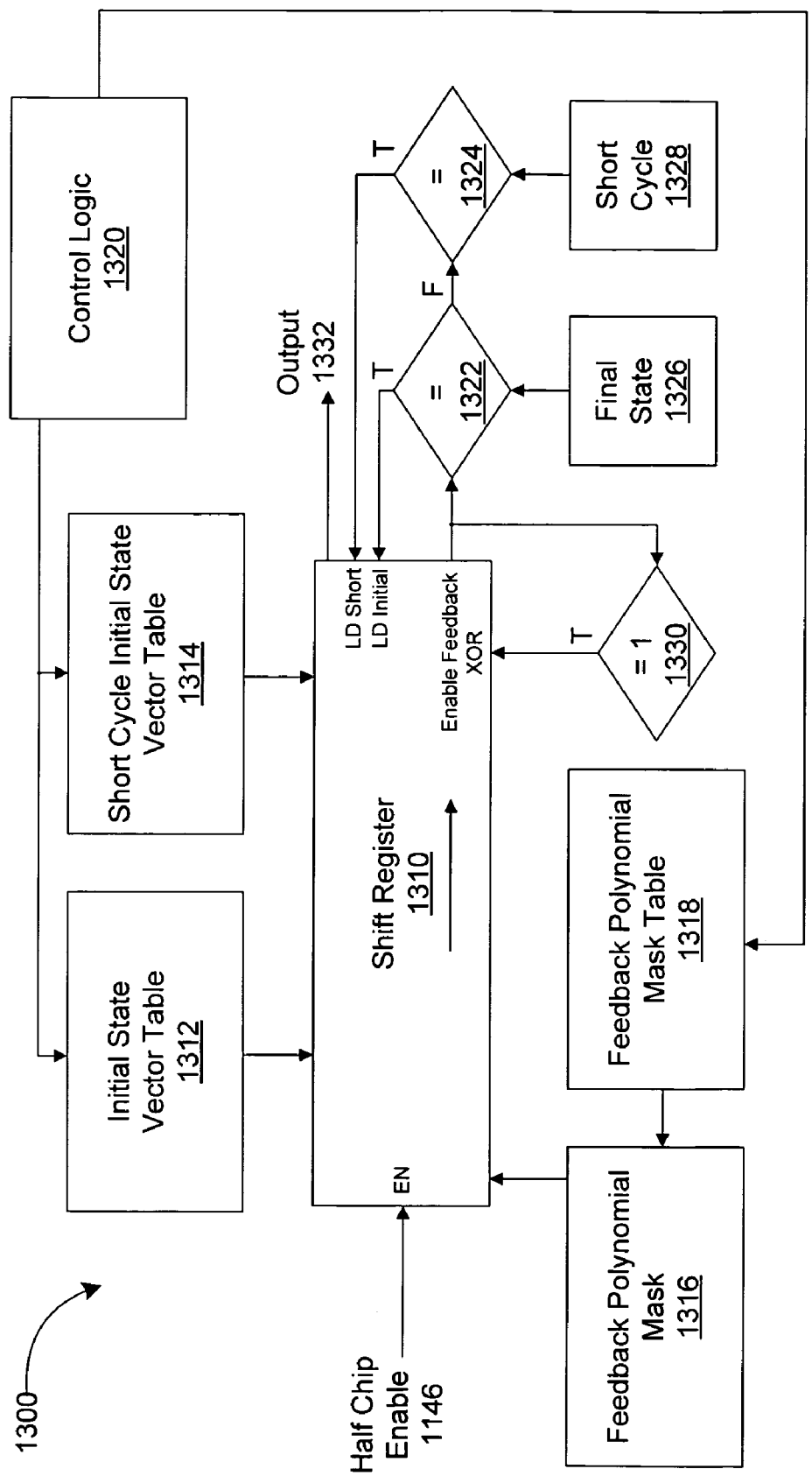
FIG. 13 is a block diagram illustrating an embodiment of a programmable code generator.

The feedback style in coders using the Galois configuration, such as the L2C coder illustrated in FIG. 5, may be easier to generalize and are subject to less ripple-through delay. Embodiment 1300 in FIG. 13 illustrates a generalized coder. The coder may be adapted, configured and/or programmed. Depending on the spread-spectrum code of interest, control logic 1320 may select an initial state vector for shift register 1310 in initial state vector table 1312, a short cycle initial state vector for the shift register 1310 in short cycle initial state vector table 1314 and/or a feedback polynomial mask 1316 in feedback polynomial mask table 1318. Embodiments of the programmable coder, which may be used as the coder 330 (FIG. 3), may have the shift register 1310 with a number of bits greater than or equal to the longest code polynomial or the code polynomial with the highest degree. The GPS L2C code has a polynomial corresponding to 27 bits. In some embodiments, to accommodate longer codes, such as some of the GALILEO codes, a 32-bit register may be used.

A programmable final state and a programmable short cycle state may be determined using logic 1322 and/or 1324 in conjunction with a stored state of the shift register 1310, using registers or tables 1326 and/or 1328. In some embodiments, the final state and/or short cycle state may be generated using an implementation of an appropriate coder using either hardware or software. In some embodiments, the final state and/or short cycle state may be determined by counting a number of code bits in output 1332 since the initial state and comparing a count to a terminal count.

The final state logic 1322 is used to create the code epoch and code restart required for codes that don't naturally recycle. For example, the length of the GPS L2C and L5 codes do not match the natural length of their component spread-spectrum codes. When the final state is detected, the shift register 1310 is reset to the initial state vector in the initial state vector table 1312.

The short cycle state logic 1324 is used to implement codes, such as the GPS L5 codes, that alter the state of the code registers in the middle of their bit sequence. The short cycle triggers the switch. When the short cycle state is detected, the shift register 1310 is reset to the short cycle initial state vector in the short cycle initial state vector table 1314. Short cycles may be disabled by setting register 1328 to a value, such as zero, that will never occur in the shift register 1310.

Programmable table or register values for defined GPS and SBAS codes are listed in the Appendix. The values for the final state register 1326 and the short cycle register 1328 were generated using a software simulation of the coders that recorded the content of the shift register at the appropriate bit number. The algorithm that was used to obtain the values of the initial state vector table or register 1312 was also used to obtain the values of the short cycle initial state vector or register 1314.

Feedback in embodiment 1300 of the programmable coder is performed by taking bit-wise exclusive- or of the feedback polynomial mask 1316 with bits in shift register 1310 if the output bit 1330 is 1. The feedback algorithm may be summarized using pseudo-code as

```
if(X[0] ≠ 0) {
    X[i = 0 to 30] = X[i + 1] ⊕ FEEDBACK[i];
    X[31] = FEEDBACK[31];
}
else{
    X[i = 0 to 30] = X[i + 1];
    X[31] = 0;
},
``` where X[i] represents a bit in the shift register 1310.

In embodiment 1300, the bits of the feedback polynomial mask 1316 are numbered from right to left (the opposite of embodiment 1200 in FIG. 12). $X^1$ is placed into the right-most (least significant) bit and $X^N$ is in the left-most bit. The 1 from the corresponding polynomial is ignored again. In some embodiments, the order of the most-significant and the least-significant bits may be reversed.

In some embodiments, the initial state of the shift register 1310 may be determined from the first N output bits of the spread-spectrum code on the output 1332. These first N bits may be taken from published tables, which may be stored in initial state vector table 1312, or may be computed using an implementation of the appropriate coder in either hardware or software. The output code bits may be stored in a packed data word $O_k$ and used as input to the following algorithm. The C/A spread-spectrum code for PRN-1 is used as an illustrative example for each operation in the procedure.

Initialize the initial state vector or register S and the shift register X 1310 to zero. The algorithm will compute the bits of the initial state register S. Initialize the feedback polynomial mask or register F 1316 to the Galois Field feedback polynomial for the desired code, numbering the bits right-to-left and ignoring the 1 in the polynomial. Thus, S=0, X=0, the feedback polynomial is $$X^{20}+X^{19}+X^{18}+X^{16}+X^{11}+X^8+X^5+X^2+1$$

and the corresponding feedback polynomial mask F is 1110 1000 0100 1001 0010 or E8492 hexadecimal. The output bits $O_k$ 1332 for the C/A spread-spectrum code PRN 1, with first bit on the right, are $O_k$=0010 100 1100 0001 0011=29C13 hexadecimal.

Set k=1. This is the next bit to be processed. The bits are numbered 1 (the first output bit) to N. Set $S_k$ to the exclusive- or of $O_k$ and $X_k$. Thus, $O_1$=1 and $S_1$=1 XOR 0=1. Shift X right one bit, i.e., X=00000 hexadecimal. If $O_k$=1, set X to the exclusive- or of X and F. Thus, X=X XOR F=00000 hexadecimal XOR E8492 hexadecimal=E8492 hexadecimal. The operations in this paragraph are repeated for k=2 to N, the length of the polynomial. The operations for a few values of k are illustrated below.

For k=2, the output bit $O_2$=1. The least significant bit of X, $X_0$, equals 0. $S_2$=$X_0$ XOR $O_2$=0 XOR 1=1. Shifting X right one bit yields X=74249 hexadecimal. Then, X=X XOR F=74249 hexadecimal XOR E8492 hexadecimal=9C6 DB hexadecimal.

For k=3, the output bit $O_3$=0. The least significant bit of X, $X_0$, equals 1. $S_3$=$X_0$ XOR $O_3$=1 XOR 0=1. Shifting X right one bit yields X=4E36D hexadecimal. The output bit equals 0 (there is no feedback).

For k=4, the output bit $O_4$=0. The least significant bit of X, $X_0$, equals 1. $S_4$=$X_0$ XOR $O_4$=1 XOR 0=1. Shifting X right one bit yields X=271 B6 hexadecimal. The output bit equals 0 (there is no feedback).

For k=5, the output bit $O_5$=1. The least significant bit of X, $X_0$, equals 0. $S_5$=$X_0$ XOR $O_5$=0 XOR 1=1. Shifting X right one bit yields X=138 DB hexadecimal. Then, X=X XOR F=138 DB hexadecimal XOR E8492 hexadecimal=FBC49 hexadecimal.

For k=6, the output bit $O_6$=0. The least significant bit of X, $X_0$, equals 1. $S_6$=$X_0$ XOR $O_{6=0}$ XOR 1=1. Shifting X right one bit yields X=7DE24 hexadecimal. The output bit equals 0 (there is no feedback).

For k=7, the output bit $O_7$=0. The least significant bit of X, $X_0$, equals 0. $S_7$=$X_0$ XOR $O_7$=0 XOR0=0. Shifting X right one bit yields X=3EF12 hexadecimal. The output bit equals 0 (there is no feedback).

For k=8, the output bit $O_8$=0. The least significant bit of X, $X_0$, equals 0. $S_8$=$X_0$ XOR $O_8$=0 XOR 0=0. Shifting X right one bit yields X=1F789 hexadecimal. The output bit equals 0 (there is no feedback).

The operations are repeated for bits 9 through 20, yielding S=0E53F hexadecimal for the C/A spread-spectrum code PRN-1.

The embodiment 1300 of the programmable coder may generate any of the spread-spectrum codes used by the public GNSS satellite signals. While embodiment 1300 illustrates the Galois configuration, in other embodiments an equivalent Fibonacci configuration may be used. The Fibonacci configuration, however, may result in an implementation that is larger and that utilizes more complicated circuitry to generalize final states and short cycle states.

Figure 15:
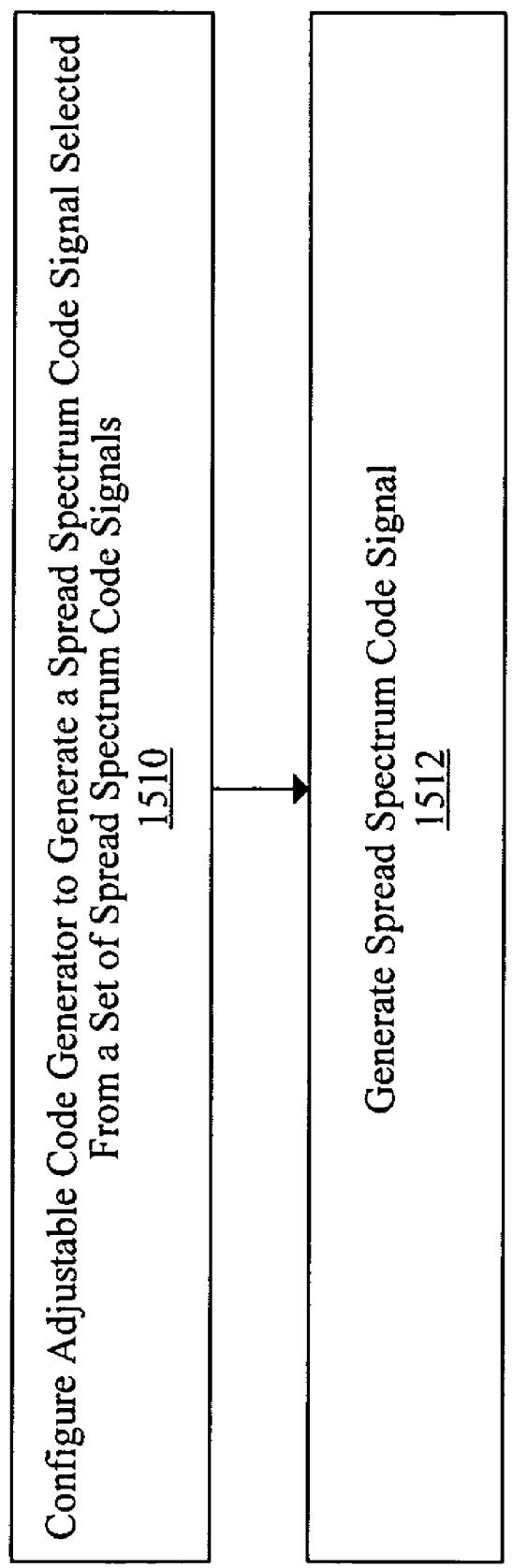
FIG. 15 is a flow diagram illustrating a method of operating a programmable code generator in a GNSS receiver.

FIG. 15 illustrates an embodiment of operations in the satellite navigation device. An adjustable code generator is configured to generate a spread-spectrum code selected from a set of spread-spectrum code signals (1510). The spread-spectrum code signal is generated (1512). In some embodiments, there may be fewer or additional operations, an order of the operations may be rearranged and/or two or more operations may be combined.

Figure 14:
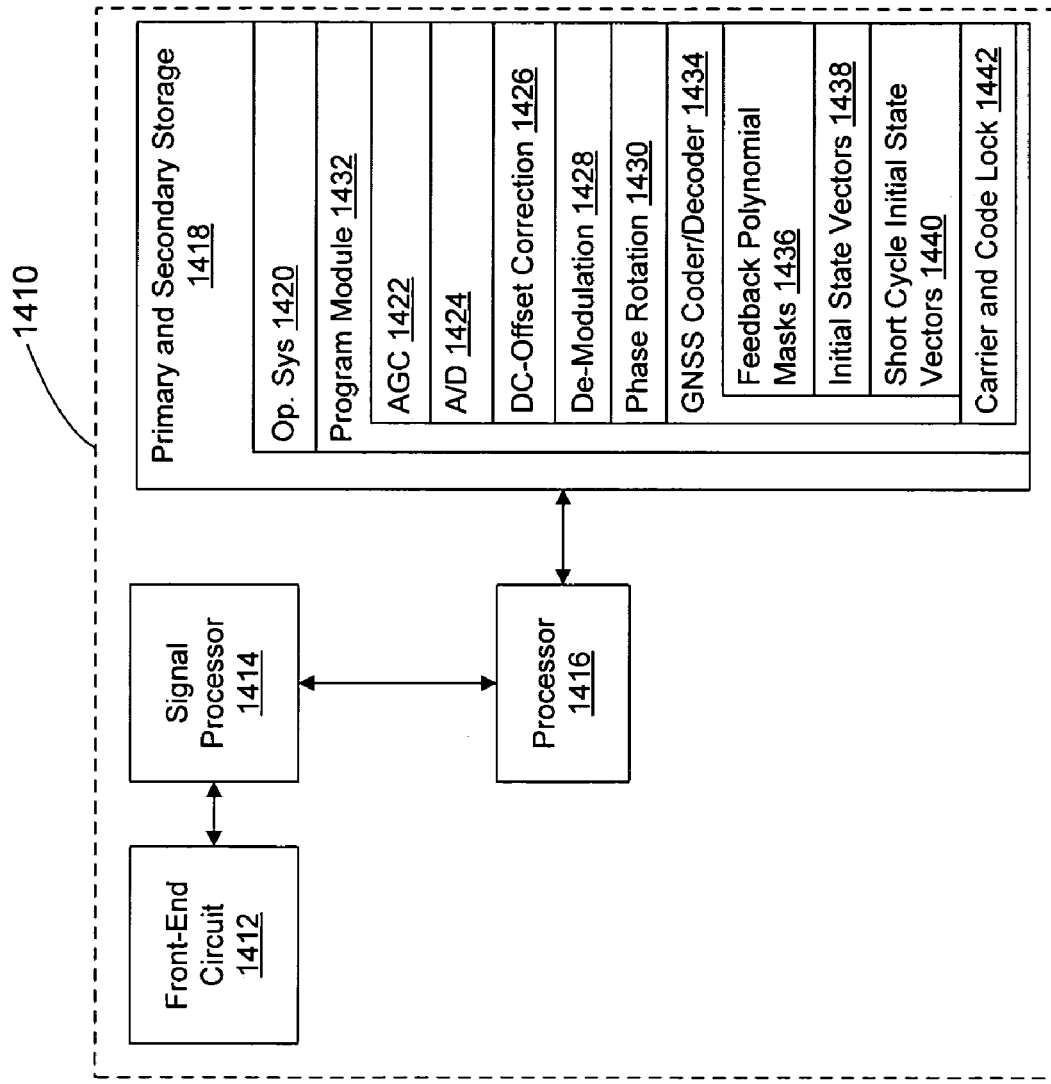
FIG. 14 is a block diagram illustrating components in a GNSS receiver.

FIG. 14 illustrates an embodiment of a device 1410, such as the device 110 (FIG. 1), in a global navigation satellite system (GNSS). The device 1410 includes a front-end circuit 1412, a signal processor 1414, such as signal processor 242 (FIG. 2A), at least one processor 1416 and a memory 1418. The memory 1418, which may include high-speed random access memory and may also include non-volatile memory, such as one or more magnetic disk storage devices, EEPROM and/or Flash EEPROM, includes an operating system 1420 and at least one program module 1432, executed by processor 1416. At least the one program module 1432 includes instructions and/or files corresponding to circuits for AGC 1422, A/D converter 1424, DC-Offset correction 1426, de-modulation 1428, phase rotation 1430, GNSS coder/decoder 1434 and carrier and code lock 1442. The A/D converter 1424 may include one or more quantization mappings. The phase rotation 1430 may include sine/cosine look-up table. The GNSS coder/decoder 1434 may include feedback polynomial masks 1436, initial state vectors 1438 and short cycle initial state vectors 1440. The program module 1432 may include optional multi-path correction (such as a double-delta correction, a strobed correlator and a pulse-aperture correlator) and/or a multi-path calculation. The program module 1432 may also include instructions for adjusting the IF, filters, mixers and/or LO frequencies in one of more channels, such as the first channel, and/or one or more sub-channel circuits, such as the sub-channel circuit 200 (FIG. 2A). In some embodiments there may be more than one processor 1416. In other embodiments, the device 1410 may include an ASIC and some or all of the functionality of at least the one program module 1432, executed by the processor 1416, may be implemented in the ASIC.

While the programmable coder has been described in the context of GNSSs, similar code generators and pseudo-random sequence generators using shift registers are widely used. It should be understood, therefore, that the programmable coder, in either the Fibonacci or the Galois configurations, may be implemented in other applications besides GNSS receivers. In addition, the Cahn transformation may be used to implement a pseudo-random code generator in either the first domain or the second domain. Such a code generator may be programmable or fixed.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

APPENDIX

A summary of characteristics of spread-spectrum codes and carrier signal frequencies used in GNSSs is provided in Table I. Specifications for the GALILEO GNSS and some of the codes in the QZSS GNSS correspond to current proposals.

TABLE I

Characteristics of spread-spectrum codes and carrier signal frequencies in GNSSs.

| GNSS | Band | Frequency (MHz) | Name | Code Period | Data Code | Code Rate (1.023 MHz) |
|---|---|---|---|---|---|---|
| GPS | L1 | 1575.42 | C/A | 1 ms | BPSK | 1 |
| GPS | L1 | 1575.42 | P(Y) | 1 week | BPSK | 10 |
| GPS | L2 | 1227.6 | P(Y) | 1 week | BPSK | 10 |
| GPS | L2 | 1227.6 | L2CM | 20 ms | FEC | 0.5 |
| GPS | L2 | 1227.6 | L2CL | 1.5 s | None | 0.5 |
| GPS | L5 | 1176.45 | I5 | 1 ms, 10 ms | FEC | 10 |
| GPS | L5 | 1176.45 | Q5 | 1 ms, 20 ms | None | 10 |
| GALILEO (PRS) | L1 | 1575.42 | L1A | TBD | TBD | TBD |
| GALILEO (OS, CS) | L1 | 1575.42 | L1B | 4 ms | FEC, BI | 1 |
| GALILEO (OS, CS) | L1 | 1575.42 | L1C | 4 ms, 25 ms | None | 1 |
| GALILEO (OS, CS) | L5 (E5A) | 1176.45 | E5AI | 1 ms, 20 ms | FEC, BI | 10 |
| GALILEO (OS, CS) | L5 (E5A) | 1176.45 | E5AQ | 1 ms, 100 ms | None | 10 |
| GALILEO (OS, CS) | E5B | 1207.14 | E5BI | 1 ms, 4 ms | FEC, BI | 10 |
| GALILEO (OS, CS) | E5B | 1207.14 | E5BQ | 1 ms, 100 ms | None | 10 |
| GALILEO (PRS) | E6 | 1278.75 | E6A | TBD | TBD | TBD |
| GALILEO (CS) | E6 | 1278.75 | E6B | 1 ms | FEC, BI | 5 |
| GALILEO (CS) | E6 | 1278.75 | E6C | 2 ms, 100 ms | None | 5 |
| WAAS | L1 | 1575.42 | C/A | 1 ms | BPSK | 1 |
| WAAS | L5 | 1176.45 | TBD | TBD | TBD | TBD |

TABLE I-continued

Characteristics of spread-spectrum codes and carrier signal frequencies in GNSSs.

| GNSS | Band | Frequency (MHz) | Name | Code Period | Data Code | Code Rate (1.023 MHz) |
|---|---|---|---|---|---|---|
| EGNOS | L1 | 1575.42 | C/A | 1 ms | BPSK | 1 |
| EGNOS | L5 | 1176.45 | TBD | TBD | TBD | TBD |
| MSAS | L1 | 1575.42 | C/A | 1 ms | BPSK | 1 |
| MSAS | L5 | 1176.45 | TBD | TBD | TBD | TBD |
| QZSS | L1 | 1575.42 | C/A | 1 ms | BPSK | 1 |
| QZSS | L2 | 1227.6 | L2CM | 20 ms | FEC | 0.5 |
| QZSS | L2 | 1227.6 | L2CL | 1.5 s | None | 0.5 |
| QZSS | L5 | 1176.45 | L5I | 1 ms, 10 ms | FEC | 10 |
| QZSS | L5 | 1176.45 | L5Q | 1 ms, 20 ms | None | 10 |
| QZSS | L6 | 1278.75 | TBD | TBD | TBD | TBD |
| GLONASS | L1 | 1602 to 1609.3125 | G | 1 ms | Manchester | 0.4995 |
| GLONASS | L2 | 1246 to 1251.6875 | G | 1 ms | None | 0.4995 |

OS = Open Service, CS = Encrypted Commercial Service, PRS = Encrypted Public Regulatory Service, FEC = Forward error correction (Viterbi) and BI = Block Interleave.

Values of initial states, final states, short cycle states and/or short cycle initial states for GPS and SBAS codes are listed in Tables II-VI. There is a table for each code type. The values may be used with the programmable coder 1310 (FIG. 13). The corresponding feedback polynomial mask 1316 (FIG. 3) is the same for all the codes of the same type and is given in the caption of each table. Cells with a 0 indicate parameters that are not needed for that particular code. These parameters may be initialized to zero.

TABLE II

Initial state, final state, short cycle state and short cycle initial state values for the C/A Gold code family.
The corresponding feedback value is 000E8492 hexadecimal.

| PRN | Initial State (Hexadecimal) | Final State (Hexadecimal) | Short Cycle (Hexadecimal) | Short Cycle Initial State (Hexadecimal) |
|---|---|---|---|---|
| 1 | 0000E53F | 0 | 0 | 0 |
| 2 | 0001F75B | 0 | 0 | 0 |
| 3 | 0003D393 | 0 | 0 | 0 |
| 4 | 00079A03 | 0 | 0 | 0 |
| 5 | 0007E2ED | 0 | 0 | 0 |
| 6 | 000FF8FF | 0 | 0 | 0 |
| 7 | 0003EBED | 0 | 0 | 0 |
| 8 | 0007EAFF | 0 | 0 | 0 |
| 9 | 000FE8DB | 0 | 0 | 0 |
| 10 | 000004C7 | 0 | 0 | 0 |
| 11 | 000034AB | 0 | 0 | 0 |
| 12 | 000095C3 | 0 | 0 | 0 |
| 13 | 000116A3 | 0 | 0 | 0 |
| 14 | 00021063 | 0 | 0 | 0 |
| 15 | 00041DE3 | 0 | 0 | 0 |
| 16 | 000806E3 | 0 | 0 | 0 |
| 17 | 00002C9D | 0 | 0 | 0 |
| 18 | 0000641F | 0 | 0 | 0 |
| 19 | 0000F51B | 0 | 0 | 0 |
| 20 | 0001D713 | 0 | 0 | 0 |
| 21 | 00039303 | 0 | 0 | 0 |
| 22 | 00071B23 | 0 | 0 | 0 |
| 23 | 00000CD5 | 0 | 0 | 0 |
| 24 | 0000D553 | 0 | 0 | 0 |
| 25 | 00019783 | 0 | 0 | 0 |
| 26 | 00031223 | 0 | 0 | 0 |
| 27 | 00061963 | 0 | 0 | 0 |
| 28 | 000C0FE3 | 0 | 0 | 0 |
| 29 | 0000ED2D | 0 | 0 | 0 |
| 30 | 0001E77F | 0 | 0 | 0 |
| 31 | 0003F3DB | 0 | 0 | 0 |
| 32 | 0007DA93 | 0 | 0 | 0 |

TABLE II-continued

Initial state, final state, short cycle state and short cycle initial state values for the C/A Gold code family.
The corresponding feedback value is 000E8492 hexadecimal.

| PRN | Initial State (Hexadecimal) | Final State (Hexadecimal) | Short Cycle (Hexadecimal) | Short Cycle Initial State (Hexadecimal) |
|---|---|---|---|---|
| 33 | 000F8803 | 0 | 0 | 0 |
| 34 | 000FC893 | 0 | 0 | 0 |
| 35 | 0001EF6D | 0 | 0 | 0 |
| 36 | 0003E3FF | 0 | 0 | 0 |
| 37 | 000FC893 | 0 | 0 | 0 |
| 120 | 000A976E | 0 | 0 | 0 |
| 121 | 0002B502 | 0 | 0 | 0 |
| 122 | 00070B07 | 0 | 0 | 0 |
| 123 | 000B5097 | 0 | 0 | 0 |
| 124 | 00088BD8 | 0 | 0 | 0 |
| 125 | 000BF5F6 | 0 | 0 | 0 |
| 126 | 0005F240 | 0 | 0 | 0 |
| 127 | 000C17D5 | 0 | 0 | 0 |
| 128 | 00016A44 | 0 | 0 | 0 |
| 129 | 0007BE42 | 0 | 0 | 0 |
| 130 | 0006290F | 0 | 0 | 0 |
| 131 | 00059691 | 0 | 0 | 0 |
| 132 | 00055721 | 0 | 0 | 0 |
| 133 | 0009A9D0 | 0 | 0 | 0 |
| 134 | 00091C95 | 0 | 0 | 0 |
| 135 | 000AE792 | 0 | 0 | 0 |
| 136 | 00044545 | 0 | 0 | 0 |
| 137 | 000B3446 | 0 | 0 | 0 |
| 138 | 000435B9 | 0 | 0 | 0 |

TABLE III

Initial state, final state, short cycle state and short cycle initial state values for the X51 code family. The corresponding feedback value is 02C11DED hexadecimal.

| PRN | Initial State (Hexadecimal) | Final State (Hexadecimal) | Short Cycle (Hexadecimal) | Short Cycle Initial State (Hexadecimal) |
|---|---|---|---|---|
| 1 | 00E22805 | 0325B312 | 0388A014 | 027D0BD1 |
| 2 | 03B3132E | 013AA9DB | 004A00D5 | 015D465C |
| 3 | 02A88F91 | 02111030 | 01A649F2 | 036A7F22 |
| 4 | 02F9A0F3 | 010D42D0 | 00E2F47A | 03C821E6 |
| 5 | 0013D3B8 | 008E33E4 | 004F4EE0 | 039EFCAB |
| 6 | 01A2E9B7 | 0169D4A6 | 03099D07 | 00FC88B5 |

TABLE III-continued

Initial state, final state, short cycle state and short cycle initial state values for the X51 code family. The corresponding feedback value is 02C11DED hexadecimal.

| PRN | Initial State (Hexadecimal) | Final State (Hexadecimal) | Short Cycle (Hexadecimal) | Short Cycle Initial State (Hexadecimal) |
|---|---|---|---|---|
| 7 | 029B18A0 | 02DF7AF5 | 01681536 | 030D5140 |
| 8 | 0172A1C5 | 00889FC6 | 0048BCCF | 015C1851 |
| 9 | 0079C99C | 02E23B95 | 01E72670 | 034AC8E3 |
| 10 | 02F590BB | 015103F7 | 00D2355A | 03D04176 |
| 11 | 02177DF7 | 0395112C | 0359806A | 02159BEE |
| 12 | 01C4F5DA | 031E3252 | 0291ECB3 | 0030B06F |
| 13 | 02CB05CD | 02281B6B | 00286082 | 03AD6B9A |
| 14 | 02B7A928 | 0322C33A | 01DAD316 | 03543250 |
| 15 | 00ECA457 | 0033119A | 03B2915C | 02601375 |
| 16 | 00E31A0A | 00CE806C | 038C6828 | 027F6FCF |
| 17 | 02E9BA10 | 01154E42 | 00A29FF6 | 03E81420 |
| 18 | 019800FB | 02ABAC63 | 03E23837 | 00895A2D |
| 19 | 02EC1A20 | 031C0C4F | 00B41F36 | 03E35440 |
| 20 | 03C36186 | 01352187 | 018BCA75 | 01BDA30C |
| 21 | 01109B91 | 028CE98D | 01C0559F | 01986CF9 |
| 22 | 01A26BB0 | 00BF9AC8 | 030B951B | 00FD8CBB |
| 23 | 01F2C2DB | 01D92A9A | 024930B7 | 005CDE6D |
| 24 | 01B40575 | 02C7F460 | 03522E0F | 00D15131 |
| 25 | 00957086 | 022E354E | 0255C218 | 0293BAD7 |
| 26 | 024346A3 | 0311E00D | 02096D3A | 02BDED46 |
| 27 | 011787BB | 03CF482F | 01DC2537 | 019654AD |
| 28 | 02A0C3E3 | 02F6314E | 0187783A | 037AE7C6 |
| 29 | 01A207B2 | 0030C58C | 030A2513 | 00FD54BF |
| 30 | 00621118 | 02BCC6A8 | 01884460 | 037D79EB |
| 31 | 0005097B | 0367BC80 | 001425EC | 03B3492D |
| 32 | 02DE671A | 0127EB7C | 007DEBDE | 0387AE34 |
| 33 | 010BC112 | 03045ADE | 01AD3F93 | 01AED9FF |
| 34 | 01F2F4DA | 019EB538 | 0249E8B3 | 005CB26F |
| 35 | 035B8C0D | 018537BF | 03E87C59 | 008C781A |
| 36 | 024B0AD1 | 03F6C173 | 02285CF2 | 02AD75A2 |
| 37 | 00B16379 | 026DBCD5 | 02C58DE4 | 02DB9D29 |

TABLE IV

Initial state, final state, short cycle state and short cycle initial state values for the X5Q Gold code family. The corresponding feedback value is 02C11DED hexadecimal.

| PRN | Initial State (Hexadecimal) | Final State (Hexadecimal) | Short Cycle (Hexadecimal) | Short Cycle Initial State (Hexadecimal) |
|---|---|---|---|---|
| 1 | 02C325BD | 02406551 | 0008E142 | 03BD2B7A |
| 2 | 01529403 | 00B886E2 | 00C86BD7 | 011C73DD |
| 3 | 03E38C44 | 001B862B | 01087D7D | 01FC7888 |
| 4 | 01494C87 | 00E67BDF | 00A709C7 | 012BC2D5 |
| 5 | 00FE34AF | 03265105 | 03F8D2BC | 02453285 |
| 6 | 01FAD4AA | 01F6CB02 | 02696973 | 004CF28F |
| 7 | 02E9D612 | 019A1106 | 00A32FFE | 03E8CC24 |
| 8 | 00095531 | 03B4A2E3 | 002554C4 | 03ABF1B9 |
| 9 | 02FA42E4 | 0123CD45 | 00ED7C26 | 03CFE5C8 |
| 10 | 0189F013 | 00462D07 | 03A5FB97 | 00AABBFD |
| 11 | 0l76EBFE | 0074503D | 00599423 | 01548C27 |
| 12 | 012168BE | 0016DE6F | 01079923 | 01FB8AA7 |
| 13 | 013CA81E | 02A71E2C | 01709BA3 | 01C00BE7 |
| 14 | 015F4E40 | 02114A33 | 00FF02DB | 0107C75B |
| 15 | 01E5A810 | 000DE8EE | 02149B9B | 00720BFB |
| 16 | 007081E0 | 01A98637 | 01C20780 | 0358581B |
| 17 | 022708D1 | 0375F47C | 039854F2 | 027571A2 |
| 18 | 003A2C05 | 0223D90C | 00E8B014 | 03CD03D1 |
| 19 | 0020AA8C | 0119480B | 0082AA30 | 03F80EC3 |
| 20 | 00F9AA82 | 03B3BEC9 | 03E6AA08 | 024A0EDF |
| 21 | 033F7679 | 0070C202 | 027B9589 | 00458CF2 |
| 22 | 0213B5CB | 02BF90B9 | 034AA09A | 021C0B96 |
| 23 | 013BD836 | 036BE0CA | 016D5B03 | 01CEEBB7 |
| 24 | 017AB7B4 | 00A74E5E | 0068E50B | 014C34B3 |

TABLE IV-continued

Initial state, final state, short cycle state and short cycle initial state values for the X5Q Gold code family. The corresponding feedback value is 02C11DED hexadecimal.

| PRN | Initial State (Hexadecimal) | Final State (Hexadecimal) | Short Cycle (Hexadecimal) | Short Cycle Initial State (Hexadecimal) |
|---|---|---|---|---|
| 25 | 02CB33CC | 026FB4C9 | 0028B886 | 03AD0798 |
| 26 | 00105DAD | 002FE335 | 004176B4 | 0399E081 |
| 27 | 017AEDB7 | 006FBEB8 | 00698D07 | 014C80B5 |
| 28 | 0368413F | 0183AD9C | 03274891 | 00EBE27E |
| 29 | 0265B345 | 00D07ADF | 0292BAA2 | 02F0068A |
| 30 | 0339EC5A | 0349B112 | 0261FD05 | 0048B8B4 |
| 31 | 012A28DE | 018661AE | 012A98A3 | 01ED0A67 |
| 32 | 0209DD47 | 00DC1094 | 032302AA | 0228DA8E |
| 33 | 03FE7AE5 | 02EDE9CA | 017FA7F9 | 01C795CA |
| 34 | 012E62E5 | 017AAE55 | 013BB04F | 01E59E11 |
| 35 | 00323A74 | 020C0894 | 00C8E9D0 | 03DD2F33 |
| 36 | 0004E370 | 01923176 | 00138DC0 | 03B09D3B |
| 37 | 03E5F862 | 027BE411 | 0111ADE5 | 01F090C4 |

TABLE V

Initial state, final state, short cycle state and short cycle initial state values for the L2CM code family. The corresponding feedback value is 0494953C hexadecimal.

| PRN | Initial State (Hexadecimal) | Final State (Hexadecimal) | Short Cycle (Hexadecimal) | Short Cycle Initial State (Hexadecimal) |
|---|---|---|---|---|
| 1 | 078A1FB4 | 05AAEC02 | 0 | 0 |
| 2 | 07B8181D | 00724A1C | 0 | 0 |
| 3 | 000BCE64 | 074E47C9 | 0 | 0 |
| 4 | 00D96BD4 | 0525240B | 0 | 0 |
| 5 | 06060739 | 04CC5A8B | 0 | 0 |
| 6 | 070D35DB | 06DC4954 | 0 | 0 |
| 7 | 01529038 | 06A9A5AB | 0 | 0 |
| 8 | 063D9CF1 | 051786E4 | 0 | 0 |
| 9 | 009EC391 | 054185FD | 0 | 0 |
| 10 | 076C3226 | 02910B46 | 0 | 0 |
| 11 | 072E9465 | 0278F802 | 0 | 0 |
| 12 | 00523F86 | 06B18B59 | 0 | 0 |
| 13 | 00456803 | 04747179 | 0 | 0 |
| 14 | 02635AE9 | 066232A9 | 0 | 0 |
| 15 | 00059900 | 0270470F | 0 | 0 |
| 16 | 02482346 | 0576C1E5 | 0 | 0 |
| 17 | 05816816 | 008C5DDC | 0 | 0 |
| 18 | 0216A3C5 | 07658843 | 0 | 0 |
| 19 | 00D02464 | 0428A045 | 0 | 0 |
| 20 | 0140E2BC | 03D73C49 | 0 | 0 |
| 21 | 0090275B | 018DA9AF | 0 | 0 |
| 22 | 0753C8D7 | 0123ED32 | 0 | 0 |
| 23 | 0097C77F | 060A0A83 | 0 | 0 |
| 24 | 078503B0 | 01FFBBA8 | 0 | 0 |
| 25 | 0701785C | 0660FF70 | 0 | 0 |
| 26 | 00214EB1 | 06AE6E47 | 0 | 0 |
| 27 | 072E3725 | 041AFD98 | 0 | 0 |
| 28 | 077DA872 | 0247FE40 | 0 | 0 |
| 29 | 03272F1C | 07ED6DBB | 0 | 0 |
| 30 | 07225407 | 010011C8 | 0 | 0 |
| 31 | 074A645B | 04643E5A | 0 | 0 |
| 32 | 00A0F48B | 0650AF3D | 0 | 0 |
| 33 | 050357C3 | 01B3280A | 0 | 0 |
| 34 | 07B47F1E | 02F73DE2 | 0 | 0 |
| 35 | 017B9EF1 | 0691C36E | 0 | 0 |
| 36 | 07BB7B2B | 053161B2 | 0 | 0 |
| 37 | 04768C4A | 016E83B8 | 0 | 0 |

TABLE VI

Initial state, final state, short cycle state and short cycle initial state values for the L2CL code family. The corresponding feedback value is 0494953C hexadecimal.

| PRN | Initial State (Hexadecimal) | Final State (Hexadecimal) | Short Cycle (Hexadecimal) | Short Cycle Initial State (Hexadecimal) |
|---|---|---|---|---|
| 1 | 0650CBFA | 02DFA89E | 0 | 0 |
| 2 | 051B10F2 | 01DE9C36 | 0 | 0 |
| 3 | 0241E00E | 07E7DD05 | 0 | 0 |
| 4 | 07220C44 | 009D0594 | 0 | 0 |
| 5 | 0004C6E5 | 00ABF11B | 0 | 0 |
| 6 | 00AC26D6 | 07C7C7B5 | 0 | 0 |
| 7 | 06AAA2BE | 016C1BD6 | 0 | 0 |
| 8 | 0218A9FF | 06231349 | 0 | 0 |
| 9 | 0036E6FC | 03A8D0D3 | 0 | 0 |
| 10 | 05C6A43E | 00A56C26 | 0 | 0 |
| 11 | 004CE755 | 031712FB | 0 | 0 |
| 12 | 013FFD28 | 05137DFB | 0 | 0 |
| 13 | 061A9CED | 02EAF59C | 0 | 0 |
| 14 | 000C3EE3 | 0765A1F9 | 0 | 0 |
| 15 | 009A9B75 | 0665AD73 | 0 | 0 |
| 16 | 06E69391 | 02669CF0 | 0 | 0 |
| 17 | 06160490 | 0061EEF6 | 0 | 0 |
| 18 | 000AFC87 | 072EC78B | 0 | 0 |
| 19 | 0554E729 | 026B79AC | 0 | 0 |
| 20 | 02DAAFF5 | 0687B66D | 0 | 0 |
| 21 | 001BE1C3 | 0760AAE5 | 0 | 0 |
| 22 | 0506796E | 00019C3C | 0 | 0 |
| 23 | 078FCF23 | 01E5978C | 0 | 0 |
| 24 | 0636B9D6 | 0006A7B2 | 0 | 0 |
| 25 | 07CF2310 | 004E5EA8 | 0 | 0 |
| 26 | 0743AF3C | 0363B6AC | 0 | 0 |
| 27 | 0702A223 | 06545BD6 | 0 | 0 |
| 28 | 024AEEB3 | 04FAA831 | 0 | 0 |
| 29 | 016BEAC4 | 06086C19 | 0 | 0 |
| 30 | 0799B4A5 | 002A1556 | 0 | 0 |
| 31 | 01098136 | 0714C941 | 0 | 0 |
| 32 | 02B533CE | 0635F679 | 0 | 0 |
| 33 | 047F63C1 | 00873FB4 | 0 | 0 |
| 34 | 073C4EC2 | 01008EB4 | 0 | 0 |
| 35 | 024B1887 | 067153D3 | 0 | 0 |
| 36 | 05C4A6C7 | 02BC141A | 0 | 0 |
| 37 | 0283963B | 070F8513 | 0 | 0 |

What is claimed:

1. A satellite navigation device, comprising:
a receiver including an adjustable code generator, the adjustable code generator being configurable to generate any of a plurality of global navigation satellite system (GNSS) spread-spectrum code signals in a GNSS, respective code signals of the plurality corresponding to respective satellites in the GNSS, the adjustable code generator having a plurality of respective configurations to generate the respective code signals, wherein each spread-spectrum code signal has a respective length corresponding to a repetition period and the plurality of spread-spectrum code signals includes first and second spread-spectrum code signals having distinct first and second lengths;
the adjustable code generator including a feedback loop, the feedback loop including a programmable feedback mask and a feedback mask table, wherein the feedback mask table contains a set of feedback masks, respective feedback masks of the set corresponding to respective spread-spectrum code signals, and a respective feedback mask for a respective spread-spectrum code signal is a binary representation of a corresponding polynomial.

2. The satellite navigation device of claim 1, the adjustable code generator including a programmable shift register having a number of bits that is greater than or equal to the degree of a highest-degree Galois polynomial corresponding to a code signal of the plurality of spread-spectrum code signals.

3. The satellite navigation device of claim 2, wherein the number of bits in the programmable shift register corresponds to a largest sum of degrees of respective polynomials that describe a respective spread-spectrum code signal in the plurality of spread-spectrum code signals.

4. The satellite navigation device of claim 3, wherein the respective polynomials comprise irreducible Galois Field polynomials.

5. The satellite navigation device of claim 1, wherein the feedback loop has multiple input bits and a single output bit.

6. The satellite navigation device of claim 5, wherein the single output bit is determined by an exclusive- or tree of the multiple input bits.

7. The satellite navigation device of claim 1, wherein the feedback loop has multiple input bits and multiple output bits.

8. The satellite navigation device of claim 7, wherein each of the multiple output bits is determined by an exclusive- or of an output bit from the programmable shift register and a respective input bit.

9. The satellite navigation device of claim 2, the adjustable code generator further including an initial state table, wherein the initial state table contains a set of initial state vectors and each initial state vector corresponds to initial values of the bits in the programmable shift register corresponding to at least one of the plurality of spread-spectrum signals.

10. The satellite navigation device of claim 2, the adjustable code generator further including control logic, wherein the control logic determines when a respective spread-spectrum signal generated using the adjustable code generator has reached the respective length and starts the next code period by programming an initial state vector in a set of initial state vectors stored in an initial state vector table into the programmable shift register, and wherein each initial state vector corresponds to initial values of the bits in the programmable shift register corresponding to at least one of the plurality of spread-spectrum signals.

11. The satellite navigation device of claim 2, the adjustable code generator further including control logic and a short cycle state table, wherein the short cycle state table contains a set of short cycle state vectors and each short cycle state vector corresponds to values of the bits in the programmable shift register corresponding to at least one of the plurality of spread-spectrum signals at a pre-determined fraction of the respective length and the control logic determines when a respective spread-spectrum signal generated using the adjustable code generator has reached the pre-determined fraction of the respective length.

12. A satellite navigation device, comprising:
a receiver including an adjustable code generator, the adjustable code generator being configurable to generate any of a plurality of global navigation satellite system (GNSS) spread-spectrum code signals in a GNSS, respective code signals of the plurality corresponding to respective satellites in the GNSS, the adjustable code generator having a plurality of respective configurations to generate the respective code signals, wherein each spread-spectrum code signal has a respective length corresponding to a repetition period and the plurality of spread-spectrum code signals includes first and second spread-spectrum code signals having distinct first and second lengths;
the adjustable code generator including a feedback loop, a programmable shift register, and control logic, wherein the control logic determines when a respective spread-spectrum signal generated using the adjustable code generator has reached a termination condition and starts the next code period by programming an initial state vector in a set of initial state vectors stored in an initial state vector table into the programmable shift register, and wherein each initial state vector corresponds to initial values of bits in the programmable shift register corresponding to at least one of the plurality of spread-spectrum signals.

13. The satellite navigation device of claim 12, the feedback loop including a programmable feedback mask and a feedback mask table, wherein the feedback mask table contains a set of feedback masks, respective feedback masks of the set corresponding to respective spread-spectrum code signals, and a respective feedback mask for a respective spread-spectrum code signal is a binary representation of a corresponding polynomial.

14. A satellite navigation device, comprising:
means for receiving a plurality of global navigation satellite system (GNSS) spread-spectrum code signals, including means for generating any of the plurality of spread-spectrum code signals, respective code signals of the plurality corresponding to respective satellites in the GNSS, the means for generating having a plurality of respective configurations to generate the respective code signals, wherein each spread-spectrum code signal has a respective length corresponding to a repetition period and the plurality of spread-spectrum code signals includes signals of at least two lengths;
the means for generating comprising:
means for selecting a feedback mask from a plurality of feedback masks corresponding to respective code signals of the plurality of GNSS spread-spectrum code signals; and
means for combining respective bits in a programmable shift register with respective bits of the selected feedback mask to generate feedback, and for providing the feedback to the programmable shift register.

15. A method, comprising:
at a satellite navigation device:
receiving a spread spectrum code signal from a satellite in a global navigation satellite system (GNSS);
configuring an adjustable code generator to generate any selected spread-spectrum code signal of a plurality of GNSS spread-spectrum code signals, respective code signals of the plurality corresponding to respective satellites in the GNSS, the adjustable code generator having a plurality of respective configurations to generate the respective code signals;
generating the selected spread-spectrum code signal; and
correlating the generated spread-spectrum code signal with the received spread-spectrum code signal to recover navigation information from the received spread-spectrum code signal,
wherein:
each spread-spectrum code signal in the plurality of spread-spectrum code signals has a respective length corresponding to a repetition period and the plurality of spread-spectrum code signals includes first and second spread-spectrum code signals having distinct first and second lengths;
configuring the adjustable code generator comprises selecting a feedback mask from a plurality of feedback masks corresponding to respective code signals of the plurality of GNSS code signals; and
generating the selected spread-spectrum code signal comprises combining respective bits in a programmable shift register with respective bits of the selected feedback mask to generate feedback, and providing the feedback to the programmable shift register.

16. The method of claim 15, wherein:
the programmable shift register comprises a number of bits that is greater than or equal to the degree of a highest-degree Galois polynomial corresponding to the plurality of spread-spectrum code signals.

17. The method of claim 16, wherein the number of bits in the programmable shift register corresponds to a largest sum of degrees of respective polynomials that describe a respective spread-spectrum code signal in the plurality of spread-spectrum code signals.

18. The method of claim 17, wherein the respective polynomials comprise irreducible Galois Field polynomials.

19. The method of claim 15, wherein the selected feedback mask for a respective spread-spectrum code signal is a binary representation of a corresponding polynomial.

20. The method of claim 15, further comprising setting an initial state of the programmable shift register using a respective initial state vector in a set of initial state vectors, wherein each initial state vector corresponds to initial values of the bits in the programmable shift register corresponding to at least one of the plurality of spread-spectrum signals.

21. The method of claim 15, further comprising determining when a respective spread-spectrum signal generated using the adjustable code generator has reached the respective length using control logic and setting an initial state of the programmable shift register using a respective initial state vector in a set of initial state vectors, wherein each initial state vector corresponds to initial values of the bits in the programmable shift register corresponding to at least one of the plurality of spread-spectrum signals.

22. The method of claim 15, further comprising determining when a respective spread-spectrum signal generated using the adjustable code generator has reached a termination condition using control logic and setting an initial state of the programmable shift register using a respective initial state vector in a set of initial state vectors, wherein each initial state vector corresponds to initial values of the bits in the programmable shift register corresponding to at least one of the plurality of spread-spectrum signals.

23. The method of claim 15, further comprising determining when a respective spread-spectrum signal generated using the adjustable code generator has reached a pre-determined fraction of the respective length using control logic and setting a short cycle state of the programmable shift register using a respective short cycle state vector in a set of short cycle state vectors, wherein each short cycle state vector corresponds to values of the bits in the programmable shift register corresponding to at least one of the plurality of spread-spectrum signals at the pre-determined fraction of the respective length.

24. A non-transitory computer readable storage medium storing one or more programs configured to be executed by at least one processor of a satellite navigation device, the one or more programs comprising:
instructions for receiving a spread spectrum code signal from a satellite in a global navigation satellite system (GNSS);
instructions for configuring an adjustable code generator to generate any selected spread-spectrum code signal of a plurality of GNSS spread-spectrum code signals, respective code signals of the plurality corresponding to respective satellites in the GNSS, the adjustable code generator having a plurality of respective configurations to generate the respective code signals;

instructions for generating the selected spread-spectrum code signal; and instructions for correlating the generated spread-spectrum code signal with the received spread-spectrum code signal to recover navigation information from the received spread-spectrum code signal, wherein:

each spread-spectrum code signal in the plurality of spread-spectrum code signals has a respective length corresponding to a repetition period and the plurality of spread-spectrum code signals includes first and second spread-spectrum code signals having distinct first and second lengths;

the instructions for configuring the adjustable code generator comprise instructions for selecting a feedback mask from a plurality of feedback masks corresponding to respective code signals of the plurality of GNSS spread-spectrum code signals; and the instructions for generating the selected spread-spectrum code signal comprise instructions for combining respective bits in a programmable shift register with respective bits of the selected feedback mask to generate feedback and for providing the feedback to the programmable shift register.

25. A computer, comprising:

a main memory;

a processor with a cache memory; and a program, stored in the main memory and executed by the processor, the program including:

instructions for receiving a spread spectrum code signal from a satellite in a global navigation satellite system (GNSS);

instructions for configuring an adjustable code generator to generate any selected spread-spectrum code signal of a plurality of GNSS spread-spectrum code signals, respective code signals of the plurality corresponding to respective satellites in the GNSS, the adjustable code generator having a plurality of respective configurations to generate the respective code signals;

instructions for generating the selected spread-spectrum code signal; and instructions for correlating the generated spread-spectrum code signal with the received spread-spectrum code signal to recover navigation information from the received spread-spectrum code signal, wherein:

each spread-spectrum code signal in the plurality of spread-spectrum code signals has a respective length corresponding to a repetition period and the plurality of spread-spectrum code signals includes first and second spread-spectrum code signals having distinct first and second lengths;

the instructions for configuring the adjustable code generator comprise instructions for selecting a feedback mask from a plurality of feedback masks corresponding to respective code signals of the plurality of GNSS spread-spectrum code signals; and the instructions for generating the selected spread-spectrum code signal comprise instructions for combining respective bits in a programmable shift register with respective bits of the selected feedback mask to generate feedback and for providing the feedback to the programmable shift register.

26. A method, comprising:

at a satellite navigation device:

receiving a spread spectrum code signal from a satellite in a global navigation satellite system (GNSS);

configuring an adjustable code generator to generate any selected spread-spectrum code signal of a plurality of GNSS spread-spectrum code signals, respective code signals of the plurality corresponding to respective satellites in the GNSS, the adjustable code generator having a plurality of respective configurations to generate the respective code signals;

generating the selected spread-spectrum code signal; and correlating the generated spread-spectrum code signal with the received spread-spectrum code signal to recover navigation information from the received spread-spectrum code signal, wherein:

each spread-spectrum code signal in the plurality of spread-spectrum code signals has a respective length corresponding to a repetition period and the plurality of spread-spectrum code signals includes first and second spread-spectrum code signals having distinct first and second lengths; and generating the selected spread-spectrum code signal comprises determining when the selected spread-spectrum signal generated using the adjustable code generator has reached a termination condition and starting the next code period by programming an initial state vector in a set of initial state vectors stored in an initial state vector table into a programmable shift register, wherein each initial state vector corresponds to initial values of the bits in the programmable shift register corresponding to at least one of the plurality of spread-spectrum signals.

27. A non-transitory computer readable storage medium storing one or more programs configured to be executed by at least one processor of a satellite navigation device, the one or more programs comprising:

instructions for receiving a spread spectrum code signal from a satellite in a global navigation satellite system (GNSS);

instructions for configuring an adjustable code generator to generate any selected spread-spectrum code signal of a plurality of GNSS spread-spectrum code signals, respective code signals of the plurality corresponding to respective satellites in the GNSS, the adjustable code generator having a plurality of respective configurations to generate the respective code signals;

instructions for generating the selected spread-spectrum code signal; and instructions for correlating the generated spread-spectrum code signal with the received spread-spectrum code signal to recover navigation information from the received spread-spectrum code signal, wherein:

each spread-spectrum code signal in the plurality of spread-spectrum code signals has a respective length corresponding to a repetition period and the plurality of spread-spectrum code signals includes first and second spread-spectrum code signals having distinct first and second lengths; and the instructions for generating the selected spread-spectrum code signal comprise instructions for determining when the selected spread-spectrum signal generated using the adjustable code generator has reached a termination condition and for starting the next code period by programming an initial state vector in a set of initial state vectors stored in an initial state vector table into a programmable shift register, wherein each initial state vector corresponds to initial values of the bits in the programmable shift register corresponding to at least one of the plurality of spread-spectrum signals.

28. A computer, comprising:

a main memory;

a processor with a cache memory; and a program, stored in the main memory and executed by the processor, the program including:

instructions for receiving a spread spectrum code signal from a satellite in a global navigation satellite system (GNSS);

instructions for configuring an adjustable code generator to generate any selected spread-spectrum code signal of a plurality of GNSS spread-spectrum code signals, respective code signals of the plurality corresponding to respective satellites in the GNSS, the adjustable code generator having a plurality of respective configurations to generate the respective code signals;

instructions for generating the selected spread-spectrum code signal; and instructions for correlating the generated spread-spectrum code signal with the received spread-spectrum code signal to recover navigation information from the received spread-spectrum code signal, wherein:

each spread-spectrum code signal in the plurality of spread-spectrum code signals has a respective length corresponding to a repetition period and the plurality of spread-spectrum code signals includes first and second spread-spectrum code signals having distinct first and second lengths; and the instructions for generating the selected spread-spectrum code signal comprise instructions for determining when the selected spread-spectrum signal generated using the adjustable code generator has reached a termination condition and for starting the next code period by programming an initial state vector in a set of initial state vectors stored in an initial state vector table into a programmable shift register, wherein each initial state vector corresponds to initial values of the bits in the programmable shift register corresponding to at least one of the plurality of spread-spectrum signals.

* * * * *